US010753200B2

(12) United States Patent
Scarton et al.

(10) Patent No.: US 10,753,200 B2
(45) Date of Patent: *Aug. 25, 2020

(54) METHOD AND APPARATUS FOR ACOUSTICAL POWER TRANSFER AND COMMUNICATION USING STEEL WEDGES

(71) Applicant: RENSSELAER POLYTECHNIC INSTITUTE, Troy, NY (US)

(72) Inventors: Henry A. Scarton, Troy, NY (US); Gary J. Saulnier, East Greenbush, NY (US); Kyle R. Wilt, Sand Lake, NY (US); R. Benjamin Litman, Huntington, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,869

(22) Filed: Mar. 15, 2019

(65) Prior Publication Data

US 2019/0277134 A1    Sep. 12, 2019

Related U.S. Application Data

(63) Continuation of application No. 15/119,302, filed as application No. PCT/US2015/017268 on Feb. 24, 2015, now Pat. No. 10,287,876.

(60) Provisional application No. 61/944,916, filed on Feb. 26, 2014.

(51) Int. Cl.
*E21B 47/16* (2006.01)
*H04B 11/00* (2006.01)
*H02J 50/15* (2016.01)

(52) U.S. Cl.
CPC .............. *E21B 47/16* (2013.01); *H02J 50/15* (2016.02); *H04B 11/00* (2013.01)

(58) Field of Classification Search
CPC .......... E21B 47/16; H02J 50/15; H04B 11/00; G01N 29/043; G01N 29/11; G01S 15/96; F16L 1/16; G01V 1/00; G01F 1/662
See application file for complete search history.

(56) References Cited

U.S. PATENT DOCUMENTS

2008/0127732 A1* 6/2008 Owens ................. G01N 29/043
73/632

* cited by examiner

*Primary Examiner* — Jamil Ahmed
(74) *Attorney, Agent, or Firm* — Martha Cullina LLP; Anthony P. Gangemi

(57) ABSTRACT

Systems and methods for transmitting power and information using acoustic energy produced by transducers are provided. The systems have particular application for powering and communication with electronics through drilling and pipe systems. Pairs of acoustic wedges holding transducers are provided for sending energy and information through a substrate which may be a steel pipe. Each wedge has an angled transducer which can be used to produce shear waves. The waves propagate through the substrate and are received by a second acoustic wedge. The shear waves, on reaching the second acoustic wedge, are converted back into electrical signals by a second transducer. Tangential shear waves, high, shallow wave transmission angles, and direct steel-steel bonding between wedges and substrates may be used.

20 Claims, 31 Drawing Sheets

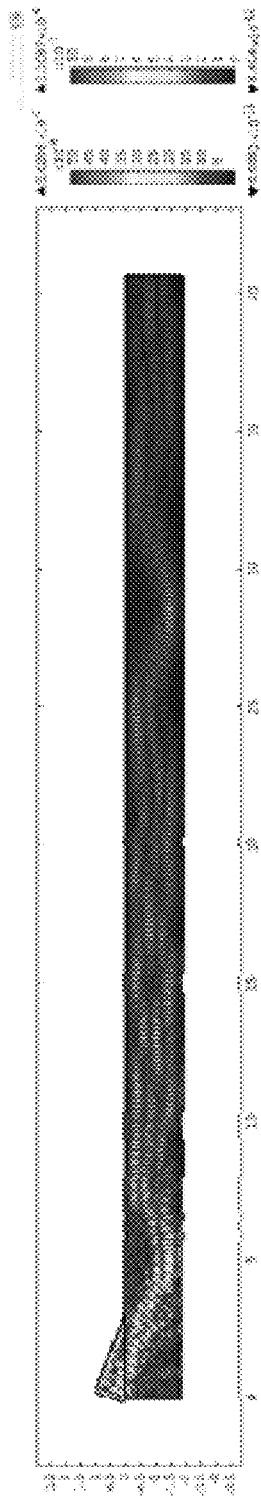

Fig. 24
Packer
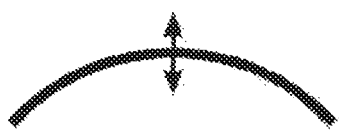 
Fig. 25a       Fig. 25b

METHOD AND APPARATUS FOR ACOUSTICAL POWER TRANSFER AND COMMUNICATION USING STEEL WEDGES

CROSS-REFERENCE TO RELATED APPLICATION

This application is a continuation of U.S. patent application Ser. No. 15/119,302, filed Aug. 16, 2016, which is a national stage filing of International Patent Application No. PCT/US2015/017268, filed Feb. 24, 2015, which claims the benefit of U.S. Provisional Application Ser. No. 61/944,916, filed Feb. 26, 2014, which is incorporated herein by reference in its entirety.

FIELD AND BACKGROUND OF THE INVENTION

The present invention relates generally to the field of acoustics, and in particular to transducers, to communication and power transmission using vibrations, and to taking sensor readings in deep wells.

A transducer is a device that converts a signal in one form of energy to another form of energy. This can include electrical energy, mechanical energy, electromagnetic and light energy, chemical energy, acoustic energy, and thermal energy, among others. While the term "transducer" often refers to a sensor or a detector, any device which converts energy can be considered a transducer.

Transducers are often used in measuring instruments. A sensor is used to detect a parameter in one form and report it in another form of energy, typically as an electrical signal. For example, a pressure sensor might detect pressure—a mechanical form of energy—and convert it to electricity for display for transmission, recording, and/or as a power source. A vibration powered generator is a type of transducer that converts kinetic energy derived from ambient vibration to electrical energy.

A transducer can also be an actuator which accepts energy and produces movement, such as vibrational energy or acoustic energy. The energy supplied to an actuator might be electrical or mechanical, such as pneumatic or hydraulic energy. An electric motor and a loudspeaker are both actuators, converting electrical energy into motion for different purposes.

Some transducers have multiple functions, both detecting and creating action. For example, an ultrasonic transducer may switch back and forth many times a second between acting as an actuator to produce ultrasonic waves, and acting as a sensor to detect ultrasonic waves and converting them into electrical signals. Analogously, rotating a DC electric motor's rotor will produce electricity, and voice-coil speakers can also function as microphones.

Piezoelectric materials can be used as transducers to harvest even low levels of mechanical energy and convert them into electrical energy. This energy can be suitable for powering wireless sensors, low power microprocessors, or charging batteries. A piezoelectric sensor or transducer is a device that uses a piezoelectric effect to measure pressure, acceleration, strain, or force by converting those physical energies into an electrical charge. The piezoelectric effect is a reversible process in that materials exhibiting the direct piezoelectric effect (generation of an electrical charge as a result of an applied mechanical force) also exhibit the reverse piezoelectric effect (generating a mechanical movement when exposed to an electrical charge or field). Thus, piezoelectric transducers can also work in reverse, turning electrical energy into physical vibrational energy and vice versa. Piezoelectric transducers have the dual advantages of working using low energy levels, and a small physical size. Ultrasonic transducers may be piezoelectric transducers, applying ultrasound waves into a body, and also receiving a returned wave from the body and converting it into an electrical signal.

In drilling and oil well operations, it is often necessary to communicate information (such as sensor data) along a drill pipe string. A drill pipe string consists of connected segments of piping. Often, portions of the well and drill string are not directly accessible via a direct electrical connection. For example, there may be segments that are disjointed and sealed off from each other, making electrical connection between the segments impossible. Since it is desirable to obtain data from deep within wells, passage of the data through these obstacles is a significant issue.

Accordingly, one method and arrangement for powering, controlling, and communicating with sensors at a distance uses acoustic wave energy. The arrangement comprises a transmission arrangement comprising an acoustic signal generator, a receiving arraignment comprising an acoustic signal receiver, a least one sensor which is electrically coupled to the signal receiver, and a waveguide spanning between and engaged to the signal generator and the signal receiver. An acoustical wave preferably comprising a control signal can be generated with the signal generator, the acoustical wave preferably having sufficient strength to provide operating power to the sensor. The acoustical wave is transmitted from the signal generator to the signal receiver through the waveguide. The acoustical wave is received at the signal receiver, and converted into an electrical current optionally comprising a converted control signal. Preferably the electrical current is also used to power a sensor, communication device and/or other devices in the vicinity of the receiving arrangement. A control signal can simultaneously or alternatively be transmitted by the above method, such as by modulating the acoustic wave.

Transmitting and receiving arrangements can comprise piezoelectric transducers, where the signal generator piezoelectric transducer generates an acoustical wave comprising a control signal in response to electrical current applied to it. The signal receiver piezoelectric transducer then receives at least part of the acoustical wave, and converts at least a portion of the received acoustical wave into an electrical current which is then used to power and/or control the sensor. The sensor is not limited to any one sensor, and may detect pressure, temperature, vibrations, sounds, light, or other conditions.

It is possible to power one or more sensors exclusively using electricity generated by the signal receiver piezoelectric transducer, particularly sensors with low power requirements.

In one useful configuration, the transmission arrangement is above ground, while the receiving arraignment and a sensor are below ground, such as in a mine, well, tunnel, or shaft. Waves transmitted from the signal generator to the signal receiver through the waveguide can be used to power and control the sensor below ground. Waves in the reverse direction can transmit sensor data or other data back to the same transmission arrangement, or to a different arrangement provided for that purpose.

Waves can be modulated in a variety of known ways to create the control signal. In a preferred embodiment a continuous wave for transmitting power is selectively modulated when it is desired to send signals or information in addition to or instead of operating power.

A method of transmitting at least one of power and signals along a substrate using angle beam probes can include: providing a transmitting acoustic wedge and a receiving acoustic wedge spaced apart on a substrate and coupled to the substrate at respective interfaces; wherein each acoustic wedge comprises a transition wedge and a transducer comprising a transducer face, wherein the transducer is coupled to the transition wedge, and wherein a transducer face of each transducer is normal to an angle .theta. with regard to the substrate at the respective interface; wherein, in some arrangements: the transducer face of the transmitting transducer of the transmitting acoustic wedge is normal to an angle $\Theta_1$ with respect to the respective interface with the substrate, the angle $\Theta_1$ in some embodiments between first and second critical angles such that longitudinal waves produced by the transmitting transducer are substantially converted into shear waves in the substrate; in some arrangements the method further comprising producing longitudinal waves at angle $\Theta_1$ at the transmitting transducer; in some arrangements, the longitudinal waves producing substantially only shear waves in the substrate, and the shear waves propagating through the substrate until reaching the interface between the substrate and the receiving acoustic wedge; in some arrangements, energy from the shear waves providing acoustical wave energy which reaches the receiving transducer of the receiving acoustic wedge; and the receiving transducer converting at least a portion of said acoustical wave energy into electrical energy.

In alternative arrangements, shear waves created by angled longitudinal waves can be used to send power and/or signals down the length of a substrate such as a steel pipe in an oil well.

A transmitting acoustic wedge and a receiving acoustic wedge can be provided spaced apart on a substrate and coupled to the substrate at respective interfaces. In one embodiment each acoustic wedge comprises a transition wedge and a transducer comprising a transducer face. The transducer is coupled to the transition wedge, and a transducer face of each transducer is normal to an angle .theta. with regard to the substrate at the respective interface. A preferably planar transducer face of the transmitting transducer of the transmitting acoustic wedge is normal to an angle $\Theta_1$ with respect to the respective interface with the substrate, the angle $\Theta_1$ being between first and second critical angles such that longitudinal waves produced by the transmitting transducer are substantially converted into shear waves in the substrate.

One method further includes producing longitudinal waves at angle .theta..sub.1 at the transmitting transducer. The longitudinal waves produce only or substantially only shear waves in the substrate, and the shear waves propagate through the substrate until reaching the interface between the substrate and the receiving acoustic wedge. Energy from the shear waves provides acoustical wave energy which reaches the receiving transducer of the receiving acoustic wedge, and the receiving transducer converts at least a portion of said acoustical wave energy into electrical energy. The energy can be used to transmit power and/or signals to sensors or other electronics. This is particularly useful for sensors and electronics deep underground.

In some arrangements, most or all of the shear wave energy which reaches the receiving acoustic wedge converts back to longitudinal waves at the receiving acoustic wedge. The receiving transducer of the receiving acoustic wedge then receives at least a portion of the longitudinal waves and converts at least a portion of said longitudinal waves into electrical energy.

In previously known arrangements, the substrate comprises metal(s) such as steel, and the transition wedges are acrylic. The substrate may be a metal pipe, such as in an oil well.

In some arrangements, wedge, transducer, and substrate methods and apparatus can also be used to send signals in the reverse direction from the receiving acoustic wedge to the transmitting acoustic wedge. The step of sending signals in the reverse direction comprises the receiving transducer generating waves at an angle with respect to the respective interface with the substrate, the angle being between first and second critical angles, and the waves propagating through the substrate to the receiving acoustic wedge.

In another arrangement, the transition wedge of the transmitting acoustic wedge includes a generally slanted edge which is normal to an angle .theta..sub.1 with respect to the respective interface with the substrate. Typically a flat or planer face of a transducer is fixed to the slanted edge so that the transducer face is oriented in the same direction, i.e. on the same plane, as the slanted edge. In practice, the orientation of the transducer will often be selected by selecting a proper angle for the slanted edge. Thus, preferably, the slanted edge is normal to an angle .theta..sub.1 is between first and second critical angles such that longitudinal waves produced by the transmitting transducer are substantially converted into shear waves in the substrate.

Though the substrate may be a large item with a large surface area and varied shape, the angle of the substrate where the respective acoustic wedges and transducers are located is a key angle of concern in selecting longitudinal wave angles. Typically this will be the angle at an interface between each acoustic wedge and the substrate.

Proper angles for launching longitudinal waves to produce shear waves in a substrate can be determined using Snell's law. The angle $\Theta_1$ between first and second critical angles can be the longitudinal wave launch angle $\Theta_{1Longitudinal}$. Thus, the method of the invention can include the step of determining $\Theta_{1Longitudinal}$ using the relationship:

$$\arcsin\left(\frac{V_{1Longitudinal}}{V_{2Longitudinal}}\right) < \theta_{1Longitudinal} < \arcsin\left(\frac{V_{1Longitudinal}}{V_{2Shear}}\right)$$

wherein $V_{1Longitudinal}$ is the longitudinal wave speed in the transition wedge, $V_{2Longitudinal}$ is the longitudinal wave speed in the substrate, and $V_{2Shear}$ is the shear wave speed of the substrate. This is a method for determining the angle and orientation of the transducers and/or slanted edges supporting the transducers.

Longitudinal wave are waves where the displacement of the medium is in the same direction as, or the opposite direction to, the direction of travel of the wave. Mechanical longitudinal waves are also called compression waves, because they produce compression and rarefaction when traveling through a medium.

A shear or transverse wave is a moving wave that consists of oscillations occurring perpendicular (i.e. at right angles) to the direction of energy transfer. If a shear wave is moving in the positive x-direction, its oscillations are in up and down in the y-z plane. With transverse waves in matter, the displacement of the medium is perpendicular to the direction of propagation of the wave. A ripple in a pond or a wave on a string are examples of transverse waves.

Power and Communication Transmission Through a Surface Via Angled Waves

For digital acoustic communication and acoustic power transfer along a substrate, continuous acoustic waves are transmitted along the substrate channel between a pair of electromechanical transducers. This technology allows remote sensing of sealed environments. A better understanding of wave propagation will allow for systems that will operate more efficiently and can act over larger ranges. Although guided wave modes in the substrate have been more extensively studied than bulk waves, wedge-introduced bulk waves have shown the potential to outperform them in some situations. Advantages include directionality of the wave field and simplicity of implementation; to excite guided modes, it is in many cases necessary to use numerous transducers, while when using wedge introduced bulk waves, a pair will often be sufficient, especially over short range.

As mentioned, in drilling and oil well operations, it is often necessary to communicate information (such as sensor data) along a drill pipe string where portions of the well and drill string are not directly accessible via a direct electrical connection. For example, there may be segments that are disjointed and sealed off from each other, making electrical connection between the segments impossible. An alternative aspect of the present invention is therefore an improved means of passing both power and data through drill pipe strings, including strings having blocked off sections, using acoustic waves sent through the pipe itself.

The system can simultaneously transmit both digital information and/or power, preferably in both directions, through the wall of a pipe or other analogous substrate using ultrasound from an angle beam probe. The angle beam probe may comprise transducers, such as an ultrasonic piezoelectric transducers.

Similar power communication systems can be implemented using longitudinal waves by using magnetostrictive means as well. Magnetostrictive materials can convert magnetic energy into kinetic energy, and vice versa.

One transmission system, shown schematically in FIG. 1, consists of two acoustic wedges 40,50, which may be sending and receiving acoustic wedges. Each acoustic wedge preferably includes a transition wedge 44,54 and a transducer 41,51. Each transducer preferably includes a generally planar face 47,57. Each transition wedge preferably has at least one slanted edge 46,56. The planar face of a transducer may be fixed to a slanted edge to fix and orient the planar face at a given angle. The angle of the slanted edge, or other aspects of the shape of the transition wedges, may be selected in order to support a transducer at a selected angle. A transition wedge may, in some embodiments, resemble a rectangular solid with a corner sliced off to provide the slanted edge, although the invention is not limited to any particular shape. Typically a bottom side of each transition wedge 44,54 is engaged to the substrate 60. The interface 48,58 of the substrate and the wedges should be as seamless as possible for sending and receiving wave energy. A signal sender/receiver, typically a transducer 41,51, is fixed to a slanted edge on the transition wedge so that a flat face of the transducer is at an intermediate angle with regard to the plane of the substrate 75 at the interface 48,58. The acoustic wedges may also be triangles or other shapes. Various arrangements to provide transducers at an angle with regard to the substrate are within the scope and spirit of the invention. In one embodiment a surface transducer A 41 is located above ground, and a second transducer B 51 is located underground.

The first acoustic wedge 40 sends longitudinal waves 70 launched by transmitting transducer a 41 through a transition block or wedge 44 into a plate or cylindrical shell 60 (e.g., pipe) at an angle such that only transverse (shear) waves 75 are produced in the plate/shell 60. The launch angle in the wedge 40,50 is selected such that it is between the first and second critical angles, so that substantially only shear waves will be produced in the wall 60. These shear waves 75 propagate down the wall 60 to a second acoustic wedge 50 which is angled such that the received shear waves 75 are converted back into longitudinal waves 70 within the transition wedge 54. The longitudinal waves 70 are then captured by the second receiving acoustic transducer B 51. In all embodiments, sending and receiving transducers may be the same or different. In one embodiment above-ground sending 41 and below-ground receiving 51 transducers are essentially the same other than their positions in the system. In some embodiments both sending and receiving transducers send and receive acoustic wave signals.

A portion of the acoustic energy captured by the receiving transducer B 51 can be harvested to produce electric energy in order to power sensors 90 or other devices 90 located in the same region as the second acoustic wedge 50 and transducer B 51. Referring to FIG. 1, the data generated by the sensors 90 near "receiving" transducer B may be sent back to the first "sending" transducer A 41. The data may be sent back digitally from transducer B 51 along a wall 60 to transducer A 41, where the data may be properly stored, displayed, or retransmitted. Data from the vicinity of transducer B 51 may also be sent elsewhere, and by other known methods. Data may also be sent back using shear waves using the method above in the reverse direction.

FIG. 2 is a background illustration and equation to help explain the concept of critical angles.

The critical angle is the angle of incidence above which total internal reflection occurs. The angle of incidence is typically measured with respect to the normal at the refractive boundary. Total internal reflection occurs when a propagating wave strikes a medium boundary at an angle larger than a particular critical angle with respect to the normal to the surface. If the refractive index is lower on the other side of the boundary and the incident angle is greater than the critical angle, the wave cannot pass through and is entirely reflected. This is particularly common as an optical phenomenon, where light waves are involved, but it occurs with other types of waves, such as electromagnetic waves in or sound waves.

When a wave crosses a boundary between materials with different refractive indices, the wave will be partially refracted at the boundary surface, and partially reflected. However, if the angle of incidence is greater than the critical angle—if the direction of propagation or ray is closer to being parallel to the boundary—then the wave will not cross the boundary and instead be totally reflected back internally. This can only occur where the wave travels from a medium with a higher refractive index to one with a lower refractive index. For example, it will occur with light when passing from glass to air, but not when passing from air to glass.

Consider a light ray passing from glass into air or. The light emanating from the interface is bent towards the glass. When the incident angle is increased sufficiently, the transmitted angle (in air) reaches 90 degrees. It is at this point no light is transmitted into air. The critical angle $\Theta_{1Critical}$ is given by Snell's law. FIG. 2 Illustrates an analogous relationship with a ray of light passing from water into air.

FIG. 3 shows the relationship between the incident angle of the angular longitudinal wave and the relative amplitudes of the refracted and/or mode converted longitudinal, shear, and surface waves that can be produced in the substrate. The method of the invention makes use of the strong shear waves which can be created by using the proper incident angle between the first and second critical angles.

Using Snell's law, the refraction angles (e.g. angles $\Theta_1$ and $\Theta_2$ in FIG. 1) for use in applicable embodiments may be determined from:

$$\frac{\sin\theta_{1Longitudinal}}{V_{1Longitudinal}} = \frac{\sin\theta_{2Shear}}{V_{2Shear}} = \frac{\sin\theta_{2Longitudinal}}{V_{2Longitudinal}} = \frac{\sin\theta_{1Shear}}{V_{1Shear}}$$

To produce only a shear wave in the plate/shell/pipe 60, the longitudinal launch angle $\Theta_{1Longitudinal}$ has to be between the first and second critical angles, which will be produced as long as the longitudinal wave in the launch material has a sound speed less than the shear wave speed of the steel:

$$\arcsin\left(\frac{V_{1Longitudinal}}{V_{2Longitudinal}}\right) < \theta_{1Longitudinal} < \arcsin\left(\frac{V_{1Longitudinal}}{V_{2Shear}}\right)$$

For example, one available launch material in is acrylic (which may be Perspex), which has a longitudinal wave speed of $V_{1Longitudinal\ acrylic}$=2,730 m/s. The first critical launch angle is found by setting $\Theta_{2Longitudinal}$ to 90°, giving the first critical angle:

$$\sin\theta_{1Longitudinal\ First\ Critical} = \frac{V_{1Longitudinal}}{V_{2Longitudinal}}$$

and the second critical launch angle is found by setting $\Theta_{2Shear}$ to 90°, giving the second critical angle $$\sin\theta_{1Longitudinal\ Second\ Critical} = \frac{V_{1Longitudinal}}{V_{2Shear}}$$

If, for example, the wall used with the above acrylic launch wedge is made of steel with a shear wave speed of $V_{2Shear}$=3,250 m/s, and a longitudinal wave speed of $V_{2Longitudinal}$=6,100 m/s, then these angles are:

$$\theta_{1Longitudinal\ First\ Critical} =$$
$$\arcsin\left(\frac{V_{1Longitudinal}}{V_{2Longitudinal}}\right) = \arcsin(2.730/6100) = 26.57°$$

$$\theta_{1Longitudinal\ Second\ Critical} =$$
$$\arcsin\left(\frac{V_{1Longitudinal}}{V_{2Shear}}\right) = \arcsin(2.730/3250) = 57.11°$$

Another material that can be used for higher temperature applications is Teflon, with a longitudinal wave speed of 1,372 m/s, and corresponding first and second critical angles of 13.46 degrees and 24.96 degrees, respectively.

So, for $\Theta_{1Longitudinal\ First\ Critical} < \Theta_1 < \Theta_{1Longitudinal\ Second\ Critical}$, only shear waves at an angle $\Theta_{2Shear}$ will be present in the communications channel. In addition, this system can also be adjusted by launching pure shear waves at angle $\Theta_{1Shear}$ using a shear wave transducer in addition to or instead of the above arrangement starting with angled longitudinal waves. Note that there will also be two waves generated in at least the transmitting wedge 44,54, due to reflection, $\Theta_{1Longitudinal}$ and $\Theta_{1Shear}$. These reflected waves are either scattered or absorbed by the other wall of the wedge.

Many different channel modulation techniques are suitable for these arrangements. Non-limiting examples include traditional single-carrier modulations such as amplitude modulation (AM), frequency modulation (FM), ON-OFF Keying (OOK), amplitude-shift keying (ASK), phase-shift keying (PSK), differential phase-shift keying (DPSK), frequency-shift keying (FSK) and quadrature amplitude modulation (QAM).

Multi-carrier modulations such as orthogonal frequency-division multiplexing can also be used and will, in general, provide higher data rates for the channel. Multi-carrier techniques offer the ability to optimize the transmission for the specific transfer function that the channel presents though the use of bit loading. In bit loading each subcarrier uses a modulation type that provides the highest data rate given the signal-to-noise ratio (SNR) of that particular subcarrier channel. Multi-carrier techniques can instead or in addition include power loading, in which the transmit power of each subcarrier is also adjusted to optimize the data throughput over all subcarriers given an overall power budget.

FIG. 4 shows a side view of an exemplary acoustic wedge mounted on a ⅞" diameter, 0.7 inch thick steel pipe substrate. The arrangement includes a transition wedge and a mounted transducer. FIG. 5 shows a section of the same pipe with a pair of acoustic wedges mounted thereon for use with the invention.

FIGS. 6 and 7 are computer generated images showing shear wave propagation. The shear waves are launched via a longitudinal wave sent through an acrylic wedge into a 0.7 inch (17.78 mm) thick submerged steel plate substrate. In both figures the Wedge is the triangle at top left, and the steel plate substrate is the thick horizontal line at the center with water above and below it. FIG. 6 shows the (pressure) 0.3 in the beam and wedge. FIG. 7 shows the xy deviatoric stress (the log of the Von Mises stress) in the beam and wedge. Both figures show the (pressure) 0.3 in the water.

FIGS. 8-10 are plots of the log of the amplitude of the pressure in the steel substrate and acrylic wedge at three different frequencies: 0.5 (FIG. 8), 1.0 (FIG. 9), and 2.25 (FIG. 10) MHz. It makes the standing wave in the solids more clear. Also the beam is now 8" instead of 3".

SUMMARY OF THE INVENTION

It is an object of the present invention to provide novel improved methods and arrangements for transmitting power and signals using acoustical waves and energy. Preferred methods and arrangements transmit power and information using shear waves, preferably tangentially polarized shear waves, through a substrate such as a pipe. Preferred methods also utilize transmission wedges made of the same material (such as steel) as the substrate, and which have a high transducer launch angle.

The systems have particular application for powering and communication with electronics such as sensors in oil or gas wells using acoustic energy where powering and communication via electric wires is not possible. For example, the system may be configured to employ acoustic energy to power and communicate with a sensor/transmitter disposed on the high pressure side of a packer where the packer provides a seal between the outside of the production tubing and the inside of the casing or well bore wall. Packer is a type of seal at the end of a production pipe. It has historically been extremely difficult to position and use electronics below the packer, and the instant invention addressees that problem.

Typical embodiments of the system include a transmission arrangement comprising an acoustic signal generator, a receiving arrangement comprising an acoustic signal receiver, at least one sensor which is electrically coupled to the signal receiver, and a waveguide or substrate (e.g., casing or wellbore wall) spanning between the signal generator and the signal receiver/sensor. Specifically, the arrangement may include a transmitting acoustic wedge and a receiving acoustic wedge spaced apart on the waveguide or substrate. The instant invention includes improvements to optimize the transfer of acoustic energy and to improve efficiency of the system. For example, such aspects may include the following:

Using tangentially polarized shear acoustic waves, particularly when one or more surfaces of the substrate (often the wall of a metal pipe) contact liquid such as oil or water. Tangential shear waves vibrate side to side "within" the metal substrate, and therefore have minimal interaction with the liquid. Radial shear waves, in contrast, vibrate in and out of the plane of the metal substrate and therefore push up against liquid contacting the substrate. The liquid, in turn, absorbs energy from the radial shear waves which dissipates the transmission.

Preferred wedges are made of the same material as the substrate. For example, steel may be used for both the wedge and substrate, such as a steel pipe. Waves produced in the steel wedge at an angled launch surface will continue into a substrate made of the same material largely unaffected. Such configurations are believed to reduce the acoustic power reflection coefficient at the interface between the wedge and the substrate. This improves efficiency.

The acoustic transmitter and acoustic receiver are preferably each attached to an angled surface of a wedge. Preferred angled surfaces are elevated between about 65 or 70 degrees and about 80 or 85 degrees with respect to the substrate below. Adjustment of the launch angle may lead to higher energy transfer efficiency.

Placing the wedges on portions of the substrate which will receive strong vibrational transmissions from the other wedge and, as a corollary, avoiding placing wedges in "dead zones" along the substrate. The location of dead zones is often periodic, and will vary depending on the transmission angles, frequencies, properties of the substrate, and other factors.

Using two adjacent transmitting wedges may make the receiving substrate displacement field more uniform and avoid dead zones.

The direction of power transmission is generally defined as the "forward" direction. Forward power transmission, and data transmission in the opposite (reverse) direction, can be accomplished by using a combined system. Forward data transmission, in the same direction as the power transmission, can also be implemented, such as by modulating the power signal.

The improved system can simultaneously transmit both digital information and/or power, preferably in both directions, through the wall of a pipe or other analogous substrate using ultrasound from an angle beam probe. The angle beam probe may comprise transducers, such as an ultrasonic piezoelectric transducers.

A preferred system comprises two acoustic wedges, which may be sending and receiving acoustic wedges. Each acoustic wedge preferably includes a transition wedge and a transducer fixed to the wedge. Each transducer preferably includes a generally planar face. Each transition wedge preferably has at least one slanted edge. The planar face of a transducer is typically fixed to a slanted edge of the wedge to fix and orient the planar face of the transducer at a given angle. The angle of the slanted edge, or other aspects of the shape of the transition wedges, may be selected in order to support a transducer at a selected angle. A transition wedge may resemble a rectangular solid with a corner sliced off to provide the slanted edge, or may be a triangular solid resembling half of a rectangular solid which has been diagonally cut in half from one edge to a diagonally opposite edge, although the invention is not limited to any particular shape. Various arrangements to provide transducers at an angle with regard to the substrate are within the scope and spirit of the invention. Typically a bottom side of each transition wedge is engaged to the substrate, in some embodiments being fully fused to the substrate or being an integral component of the substrate. In preferred embodiments the transition wedges(s) are made of the same material as the substrate. The interface of the substrate and the wedges should be as seamless as possible for sending and receiving wave energy.

In one embodiment a surface transducer is located above ground, and a second transducer is located underground.

Current acoustic technologies rely on acrylic wedges as an intermediate between the transducers and the substrate to generate shear waves in the substrate caused by interfacial diffraction. The large difference in acoustic impedance between the wedge and the substrate (most often steel) results in large reflection coefficients, hence reduced detection sensitivity. We have found that using a wedge made of the same material as the substrate decreases reflection at the wedge-substrate interface. This invention provides improvements over acoustical communication and power transfer systems previously developed by the same inventors. For example, when the transmitting and/or receiving wedges are made of the same material as the substrate, then waves produced in the wedge at the angled launch surface will continue into the substrate unaffected. Preferred wedge/substrate materials include steel/steel pairings, and other couplings both using an identical metal, alloy, or composite. These waves can be launched from the wedge launch surface as a longitudinal wave so as to remain longitudinal waves upon entering the substrate. In some embodiments, mode conversion (such as from longitudinal waves to shear waves) can occur at the opposite receiving surface or wedge.

Similarly, if shear waves are launched from the wedge/launch surface, they can remain as shear waves when they enter a substrate made of the same material as the wedge. Shear waves can be propagated with the direction of wave displacement being in the plane formed by the wedge/substrate interfaces (in-planar polarization); or they can be propagated perpendicular to the plane of the wedge (transverse polarization).

As mentioned above, one less-preferred method for introducing shear waves into a metal substrate is via a longitudinal transducer mated to an acrylic wedge. The transducer produces longitudinal waves which travel through the acrylic wedge, and which become shear waves at the joint between the acrylic block and the metal substrate. This method produces large acoustic power reflections, and consequently losses, at the interface of the wedge and the substrate due to a large acoustic impedance mismatch. This effect has been demonstrated in a modeling environment, and methods for reducing these losses are desirable. It has now been shown that a significant improvement in acoustic transfer efficiency between a wedge and substrate may be achieved by using a shear-poled transducer coupled to a steel wedge coupled to a steel substrate. This improvement is partially attributed to a reduction in the acoustic power reflection coefficient at the interface between the wedge and the substrate. In modeling of a system with a perfect interfacial boundary, it was shown that no energy is reflected off the substrate joint and back into the wedge at the interface, with substantially all of the energy being transmitted into the joint, even at very shallow angles of incidence. A steel wedge may also be used with a longitudinal transducer to efficiently introduce longitudinal waves into a steel substrate. This concept can be generalized to vibration carrying materials other than steel, such as other metals and metal alloys.

A preferred method and arrangement for transmitting at least one of power and signals along a steel oil pipe using tangential shear waves, include some or all of the following features and/or steps: a transmitting arrangement and a receiving arrangement spaced apart axially on a steel oil pipe; wherein the transmitting arrangement is above ground level and wherein the receiving arrangement is below ground level; wherein the oil pipe has concrete on at least a portion of an outer surface, and wherein, in an operative state, oil is in contact with an inner surface of the oil pipe; wherein each transmitting arrangement comprises a steel transmitting wedge and a transmitting transducer coupled to the transmitting wedge, and wherein each receiving arrangement comprises a steel receiving wedge and a receiving transducer coupled to the receiving wedge; wherein each transmitting wedge and each receiving wedge are directly bound to a surface of the oil pipe by a direct steel-steel bond; wherein the transmitting transducer comprises a flat transmitting face for emitting tangential shear waves, the transmitting face of the transmitting transducer being coupled to an angled face of the transmitting wedge; wherein the transmitting face of the transmitting transducer and the angled face of the transmitting wedge are both normal to an angle .theta. with respect to the surface of the oil pipe which the transmitting wedge is coupled to; wherein the angle .theta. is an angle of at least 75 degrees and not more than 85 degrees; the method further comprising the transmit transducer producing tangential shear waves launched at angle .theta., with said shear waves propagating through the transmitting wedge and into the oil pipe, through the oil pipe, and then into the receiving wedge, with said tangential shear waves being received by the receiving transducer; wherein said tangential shear waves substantially remain tangential shear waves as they propagate through the transmit wedge, the oil pipe, and the receiving wedge; the receiving transducer converting at least a portion of an energy content of said tangential shear waves into electrical energy, and using the electrical energy generated by the receiving transducer to at least one of provide a control signal and provide operating electricity for an electronic component.

Alternatively, the angle Θ is an angle of at least 65 or at least 70 degrees and not more than 83 degrees, or other angles and ranges discussed below. Alternatively, the waves may be longitudinal waves and the transducers longitudinal wave transducers.

Another preferred method and arrangement for transmitting at least one of power and signals along a substrate using shear waves includes some or all of the following steps and elements: a transmitting arrangement and a receiving arrangement spaced apart on a substrate; wherein each transmitting arrangement comprises a transmitting wedge and a transmitting transducer coupled to the transmitting wedge, and wherein each receiving arrangement comprises a receiving wedge and a receiving transducer coupled to the receiving wedge; wherein the transmitting transducer comprises a flat transmitting face for emitting shear waves, the transmitting face of the transmitting transducer being coupled to an angled face of the transmitting wedge; wherein the transmitting face of the transmitting transducer is normal to an angle .theta. with respect to the surface of the steel substrate which the transmitting wedge is coupled to; wherein the angle .theta. is an angle of at least 65 degrees and not more than 89 degrees, at least 70 degrees and not more than 85 degrees, or other preferred angles and ranges discussed below; the method further comprising the transmit transducer producing shear waves at angle .theta., with said shear waves propagating through the transmitting wedge and into the substrate, through the substrate, and then into the receiving wedge, with said shear waves being received by the receiving transducer; wherein said shear waves substantially remain shear waves as they pass through the transmit wedge, the substrate, and the receiving wedge; the receiving transducer converting at least a portion of an energy content of said shear waves into electrical energy, and using the electrical energy generated by the receiving transducer to at least one of provide a control signal and provide operating electricity for an electronic component.

Alternatively, the waves may be longitudinal waves and the transducers longitudinal wave transducers.

The arrangement may comprise a plurality of transmitting arrangements, such as 2 or 3 transmitting arrangements, with said transmitting arrangements positioned in series along an axial length of the pipe, wherein said transmitting arrangements all produce shear waves.

The substrate, the transmitting wedge, and the receiving wedge preferably all comprise steel, and each transmitting wedge and each receiving wedge may be directly bound to a surface of the substrate by a direct steel-steel bond.

In other preferred embodiments the substrate, the transmitting wedge, and the receiving wedge are all made of the same material. For example, the same metal or metal alloy. The substrate may be a pipe.

In some arrangements the transmitting arrangement is above ground level, and the receiving arrangement is below ground level. The substrate may be an oil pipe, wherein the oil pipe has concrete on at least a portion of an outer surface, and wherein, in an operative state, oil is in contact with an inner surface of the oil pipe. Preferably the wedges and substrate are all steel.

Transmissions may also sent in a reverse direction, from the receiving acoustic wedge to the transmitting acoustic wedge, using shear waves produced by the receiving transducer.

"Poling" refers to the particle displacement direction of the generated acoustic wave.

The embodiments which follow are presented for the purposes of illustration only and are not meant to limit the scope of the present invention. Most or all of the features of the embodiments in this disclosure are interchangeable so that each element in each embodiment may be applied to all of the embodiments taught herein.

BRIEF DESCRIPTION OF THE DRAWINGS

In the drawings:

FIG. 11(a) is Longitudinal-poled, 100 kHz, FIG. 11(b) is Shear-poled, 100 kHz, FIG. 11(c) is Longitudinal-poled, 1 MHz, and FIG. 11(d) Shear-poled, 1 MHz;

FIG. 17(a) is a prescribed displacement (PD) input, while FIG. 17(b) is a transducer input for comparison;

FIGS. 18(a)-18(b) compare shear wave simulation methods. FIG. 18(a) is a prescribed displacement (PD) input, while FIG. 18(b) is a transducer input for comparison;

FIG. 23(a) is high contrast (displacement 0.3), and FIG. 23(b) is regular;

FIG. 24 is a picture of an assembled acoustic channel across packer, composed of shear plate transducers on 75° steel wedges epoxied to the outside of a joint;

FIGS. 25a-25b schematically illustrate shear wave poling in terms of particle displacement with respect to a partial cross-section of a casing. FIG. 25(a) (left) shows radial shear displacement (in-wedge-plane poling), and FIG. 25(b) (right) shows tangential shear displacement (perpendicular to the wedge plane or out of wedge plane poling);

DESCRIPTION OF THE PREFERRED EMBODIMENTS

Figure 1:
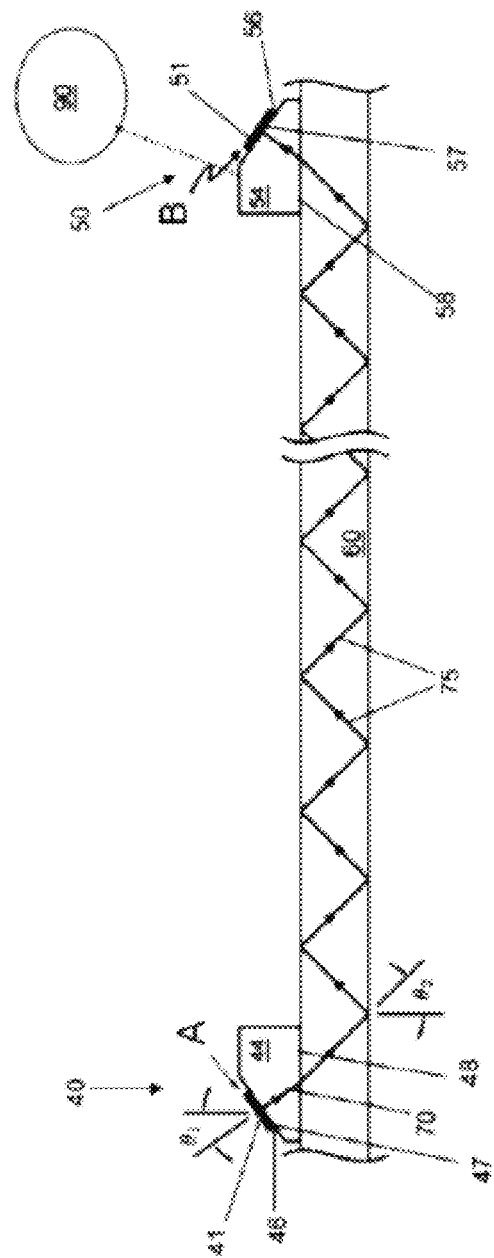
FIG. 1 is a schematic diagram of two acoustic wedges arranged on a pipe substrate for transmitting wave energy for powering sensors.
Figure 2:
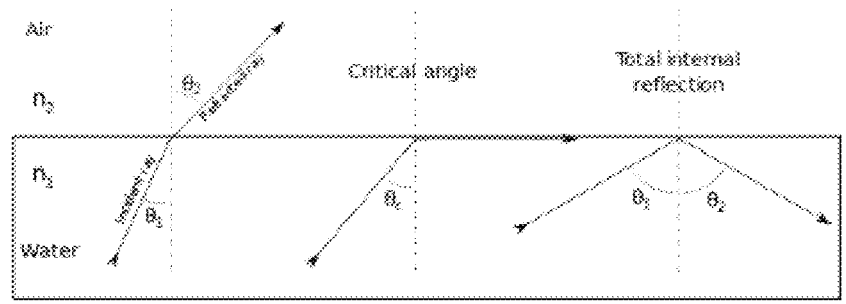
FIG. 2 is a diagram showing reflection and refraction of waves reaching a water to air interface at various angles.
Figure 3:
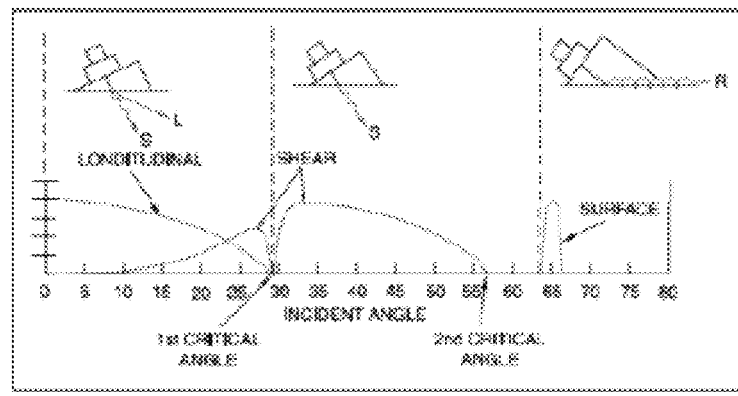
FIG. 3 is a graph and diagrams showing the relationship between the incident angle of a wave, and the type of waves produced, when such waves in an acrylic wedge reach a steel substrate.
Figure 4:
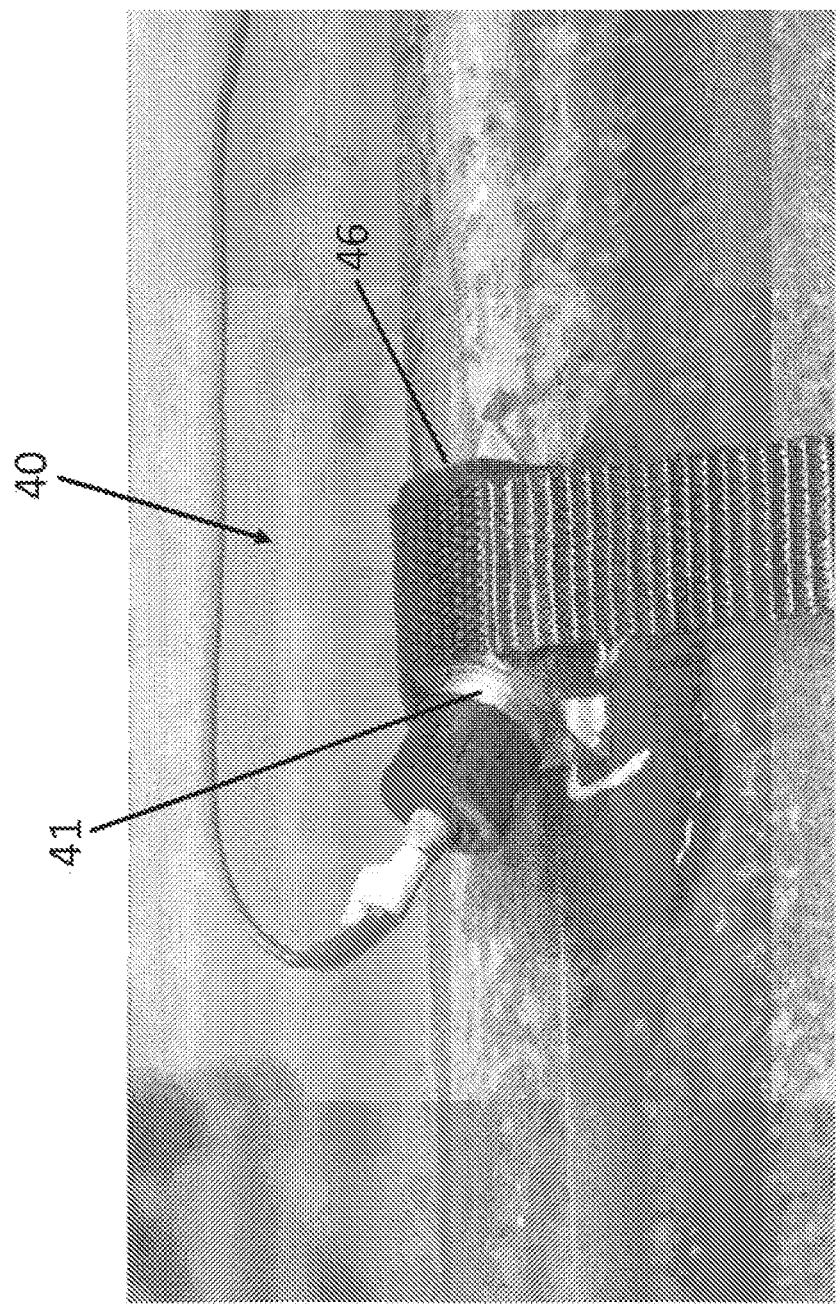
FIG. 4 is a top, side, perspective, closeup view of an acoustic wedge comprising a transducer mounted on a pipe substrate.
Figure 5:
FIG. 5 is a top front perspective view of two acoustic wedges comprising transducers mounted along a steel pipe substrate.
Figure 6:
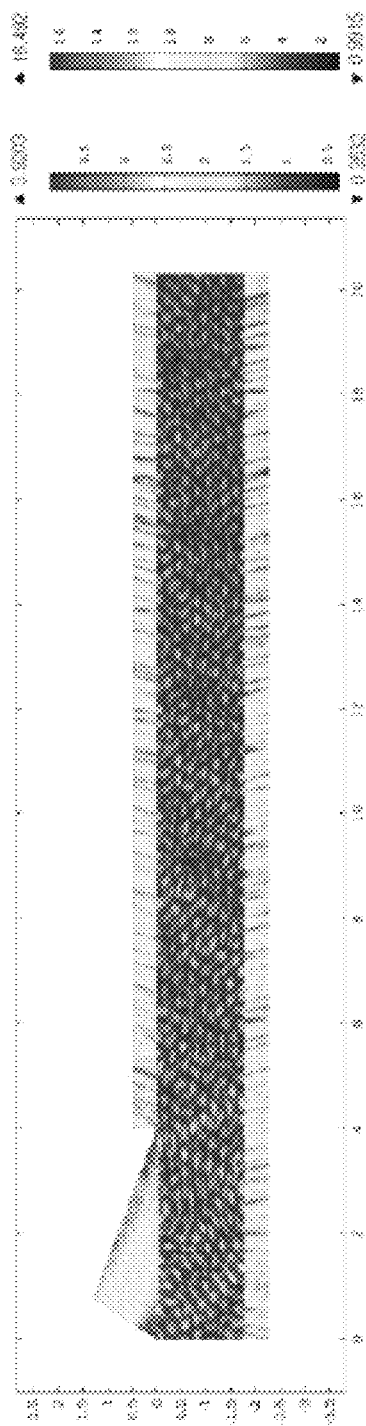
FIG. 6 shows pressure in a beam and wedge during shear wave propagation.
Figure 7:
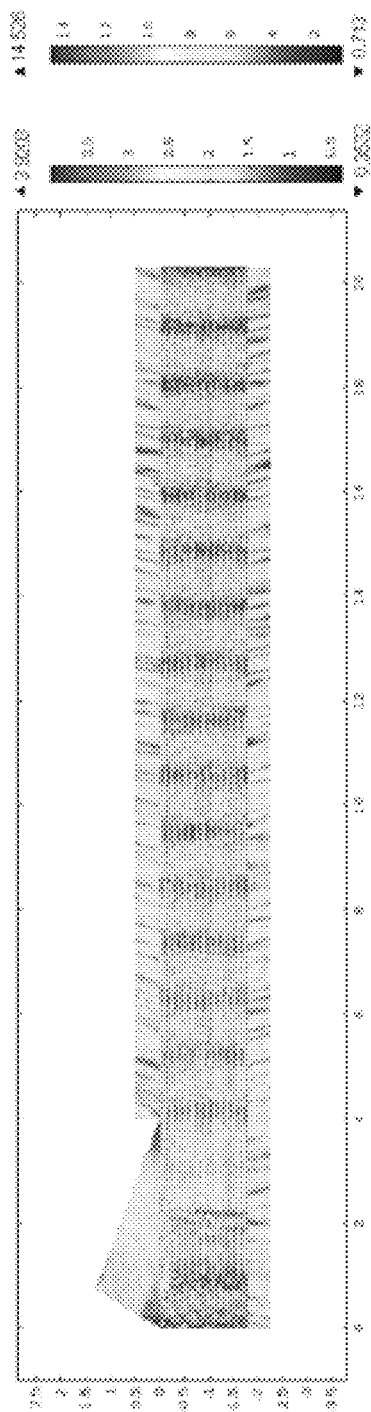
FIG. 7 shows stress in a beam and wedge during shear wave propagation.
Figure 8:
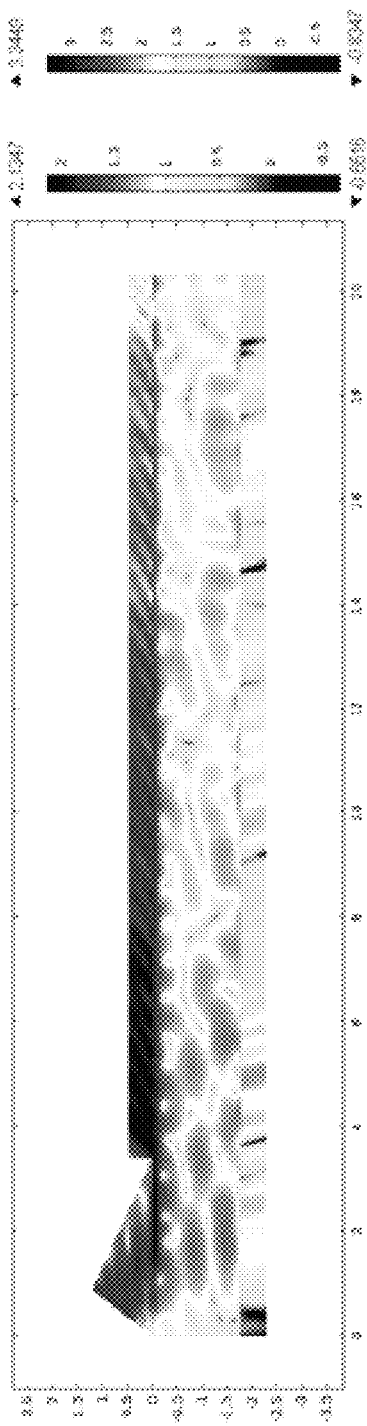
FIG. 8 shows pressure in a beam and wedge during shear wave propagation at 0.5 MHz.
Figure 9:
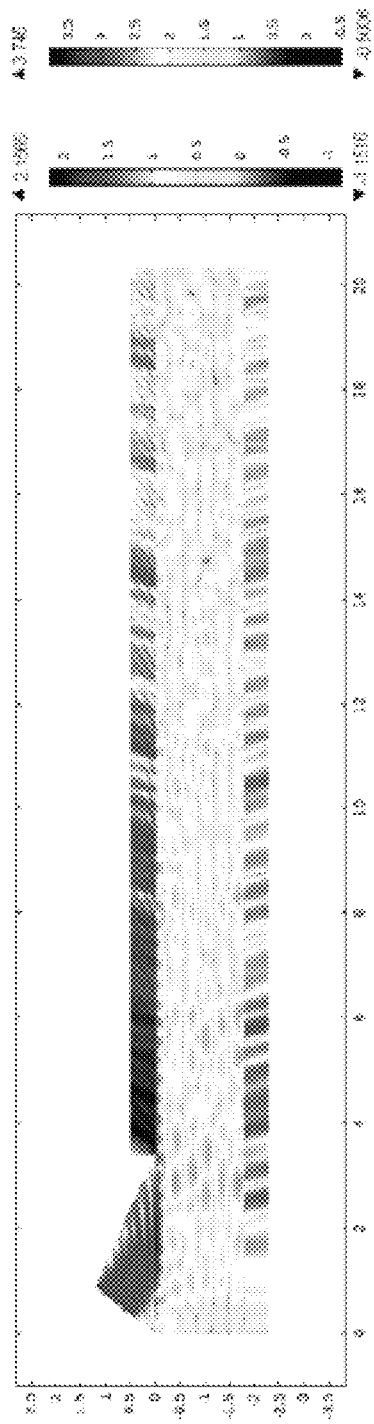
FIG. 9 shows pressure in a beam and wedge during shear wave propagation at 1.0 MHz.
Figure 10:
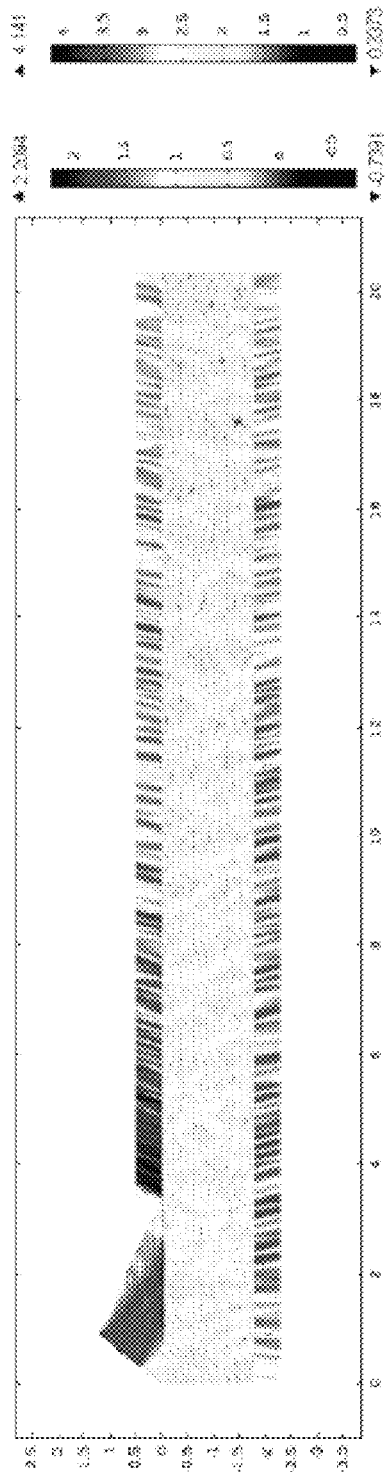
FIG. 10 shows pressure in a beam and wedge during shear wave propagation at 2.25 MHz.

FIG. 1 is a schematic illustration of a transducers/wedges/pipe substrate arraignment. This embodiment differs from a most-preferred version of the invention in that the wedges/blocks 44,54 and the substrate 80 are not made of identical materials. Therefore, the angle of the wave is depicted as changing as it passed into and then back out of the substrate 80. Nevertheless the FIG. 1 illustration is helpful to understand the different elements of acoustic wedge transmission systems. In particular, each transducer typically includes a generally planar face 47,57. Each transition wedge preferably has at least one slanted edge 46,56. The angles of the planar faces 47,57 of the transducer(s) and of the slanted edge(s) 46,56 of the blocks/wedges/transition wedges 44,54 affect the function of the acoustic channels.

Figure 27:
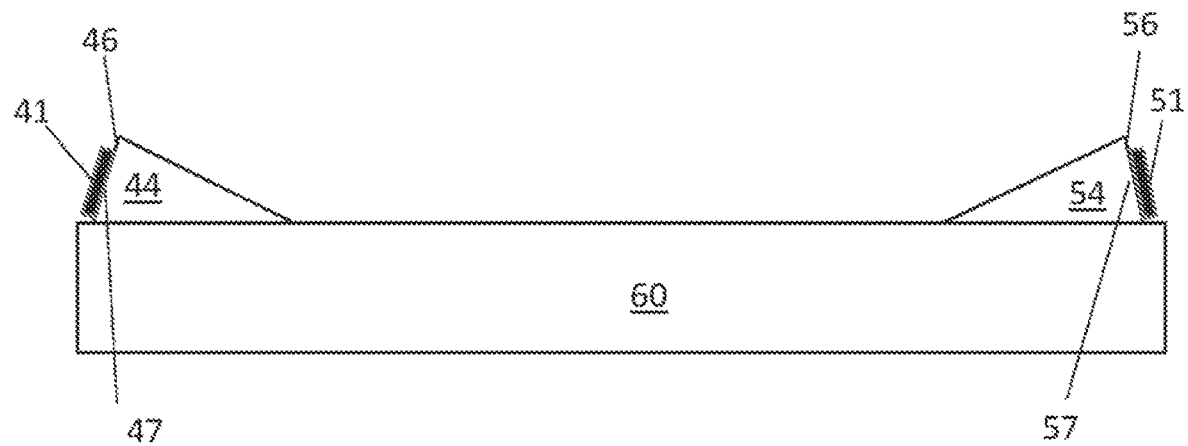
FIG. 27 is an alternative schematic diagram of two wedges arranged on a substrate for transmitting wave energy.

FIG. 27 is a simplified schematic illustration of a transducers/wedges/pipe substrate arraignment of the present invention wherein the transducer faces 47,57 and slanted wedge faces 46,56 are at a high angle with respect to the substrate 60 below, which may be a steel pipe.

Figure 28:
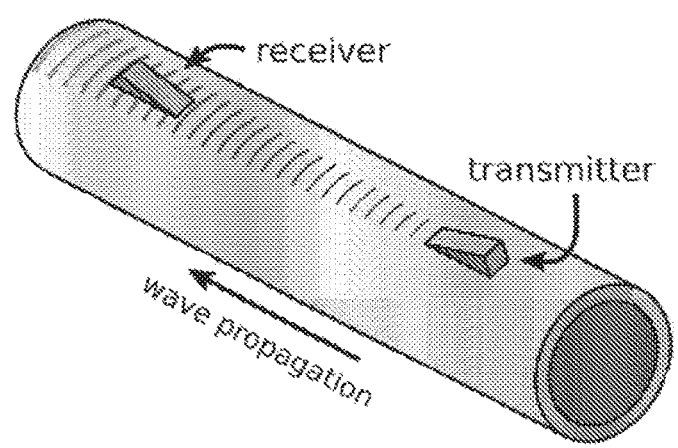
FIG. 28 is a perspective view of a simple acoustic channel with a pair of steel wedges directly mounted to a steel pipe wall.

FIG. 28 shows a pair of small triangular steel prisms or wedges joined to a steel pipe wall and aligned with the axis of the pipe. A longitudinal or shear piezoelectric transducer is attached to the small face of each wedge, as shown in the related embodiments in FIGS. 27 and 29.

While wedges and transducers are depicted on the outside of pipes in the above-mentioned figures, embodiments where both transducers and wedges are on the inside of a pipe, or where one arrangement is on the inside and the other is on the outside, are also within the scope of this invention.

Acoustical Channel Simulations

Figure 29:
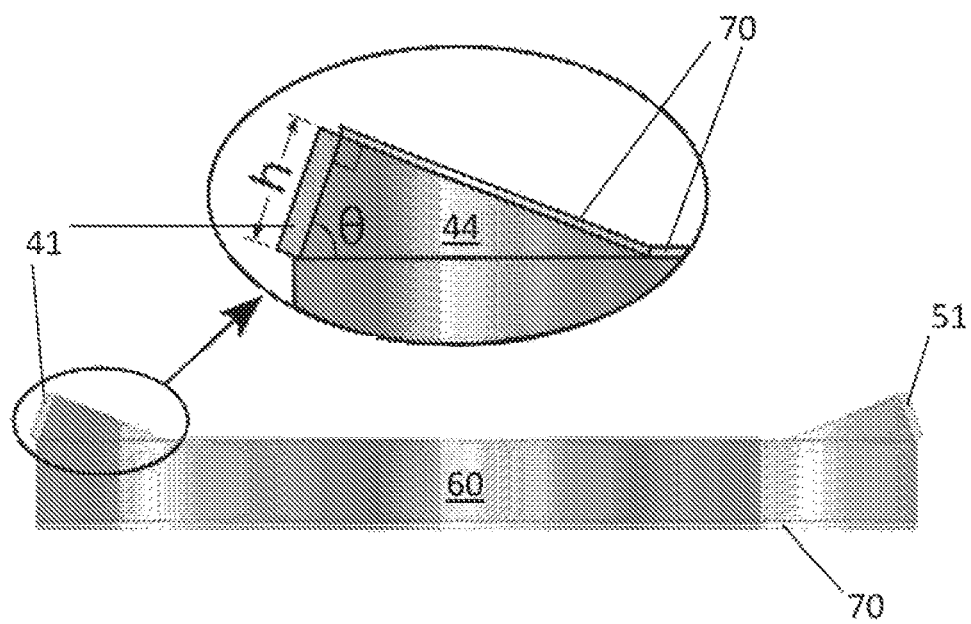
FIG. 29 is a schematic side view of a pair of transducer/wedge assemblies on a pipe including layers on the inside and outside of the pipe representing the pipe's surroundings, and a close-up inset.

The embodiment of FIG. 29 and related embodiments were tested in simulations. Tests using physical transducer assemblies were also conducted, as discussed further below. The height, h, of the inclined face of the wedge is 10 mm and the launch angle, Θ, varies between zero and 85 degrees. The "transmitter" transducer 41 is excited by a sinusoidal voltage producing a mechanical wave which then travels through the wedge 44 and into the pipe 60 wall. A portion of the energy of that wave will be received by the "receiver" transducer 51 attached to a reversely oriented second identical steel wedge, such that the continuous wave may be received and the acoustic energy harvested. The receiver transducer is terminated by a 50Ω load. The substrate pipe has a wall thickness of 17.78 mm. The simulated channels are bounded in various simulations by cement, engine oil, air and/or water. The transducers are in direct, slipless contact with the wedges so that the wedges and the pipe are effectively a single piece of steel, perfectly joined with no discernible interface. If the wedges were attached to the pipe via an adhesive layer or coupling gel rather than welding, reflections at that interface would change the wave field produced. Thus, seamless and like-to-like wedge-substrate couplings are preferred.

Due to the physical size of the channel, with wall thickness of 17.78 mm, outer nominal diameter of approximately 0.25 m, and length of up to 5 m or more, a true 3-dimensional finite element model would be very computationally intensive for wave frequencies on the order of 1 MHz. This makes the model effectively impossible to evaluate with current computers. As such, a 2-dimensional approximation of the FIG. 29 channel was employed.

The 2-dimensional model effectively treated the pipe as an infinitely wide plate (plane strain). The same is also true for both the transducers and wedges (infinitely wide plate and triangular prism, respectively). This model approximates the cross-section of the pipe if the wedges and transducers stretched completely around the circumference of the pipe, although it omits scaling effects of the particle displacement, stresses, etc., due to the radial distance from the pipe's axis. The 2-dimensional approximation cannot model motion out-of-plane (circumferential direction) movement.

The complex geometry of acoustic channels have been modeled using the finite element method, modeling the continuous wave response of the channel. Finite element simulations can be performed using the multi-physics/FEA software COMSOL. Both longitudinal and in-plane shear-poled transducers have been modeled using finite elements. Finite element methods ("FEM") are useful in simulating transducer/wedge transmission systems. The finite element method is a numerical technique for finding approximate solutions to boundary value problems for partial differential equations. It subdivides a problem domain into simpler parts, called finite elements, and uses variational methods from the calculus of variations to estimate boundary movements and interactions by minimizing an associated error function. Analogous to the idea that connecting many tiny straight lines can approximate a larger circle, FEM encompasses methods for connecting many simple element equations over many small subdomains or "finite elements" to approximate a more complex equation over a larger domain. In some simulations, Acoustic-Piezoelectric Interaction, Frequency Domain and Acoustic-Solid Interaction, and Frequency Domain modules were used. This modeling technique was used to characterize a communication channel through normal layers.

In frequency domain finite element simulations (see FIG. 29), there are preferably at least 5 to 10 elements per wavelength to achieve accurate results. This is necessary as the model must be able to resolve the acoustic wave appropriately. This study focused on the 0.1 MHz to 1 MHz range, so elements were constrained to be no larger than 0.4 mm in dimension in the wedges and pipe. This corresponds to about one eighth the wavelength of a 1 MHz shear wave, or one sixteenth that of a longitudinal wave. The meshes of the surrounding cement, engine oil and air regions of the models were made finer in proportion to their lower sound speeds (corresponding to shorter wavelengths at a given frequency). In the solid materials, the wavelength of a shear wave limits mesh size because shear waves travel more slowly than longitudinal waves. Shear wave speed can usually be approximated as near half the longitudinal wave speed.

Figure 11A:
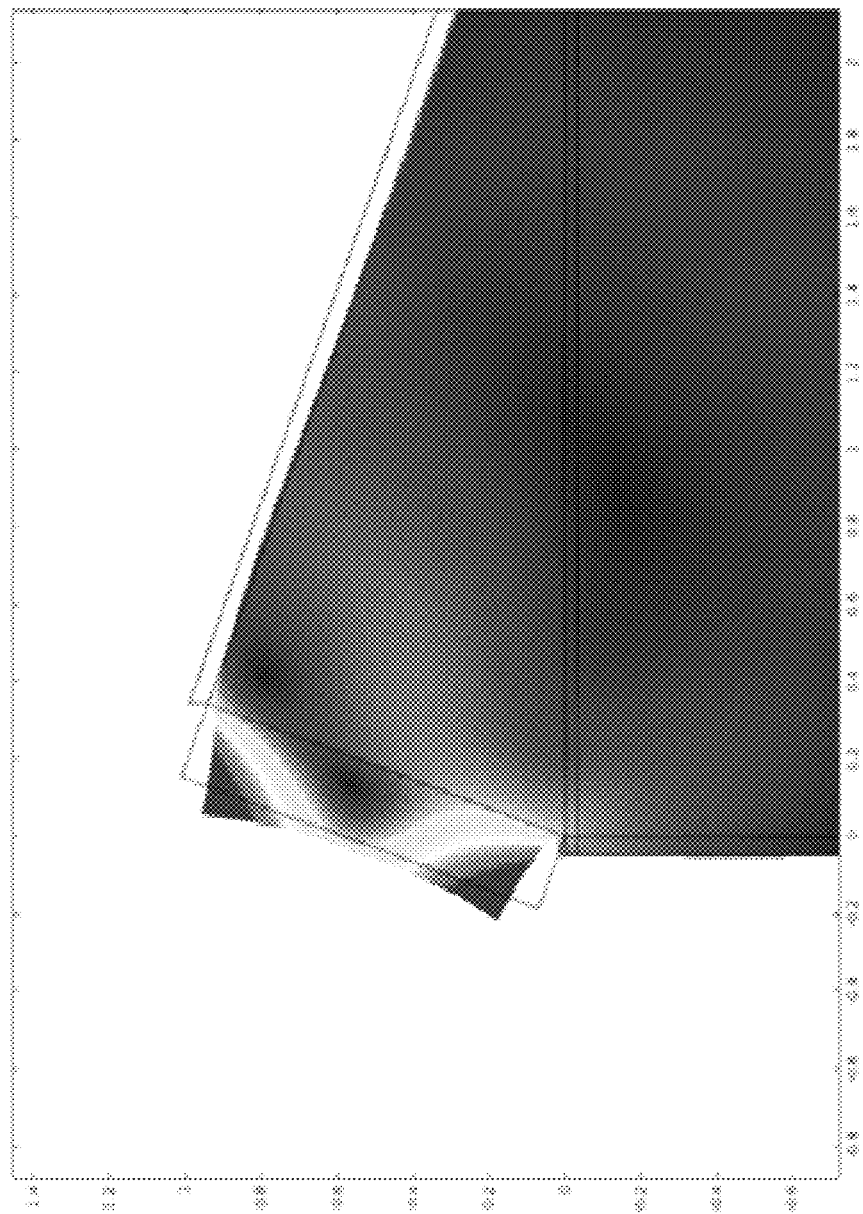
FIGS. 11a-11d show steady-state harmonic simulations of longitudinal and shear piezoelectric transducers at low (a and b freq(1)=0.1 MHz) and high (c and d freq(1)=1.0 MHz) frequencies attached to 70° wedges. Displacement at time t=0 is plotted.
Figure 11B:
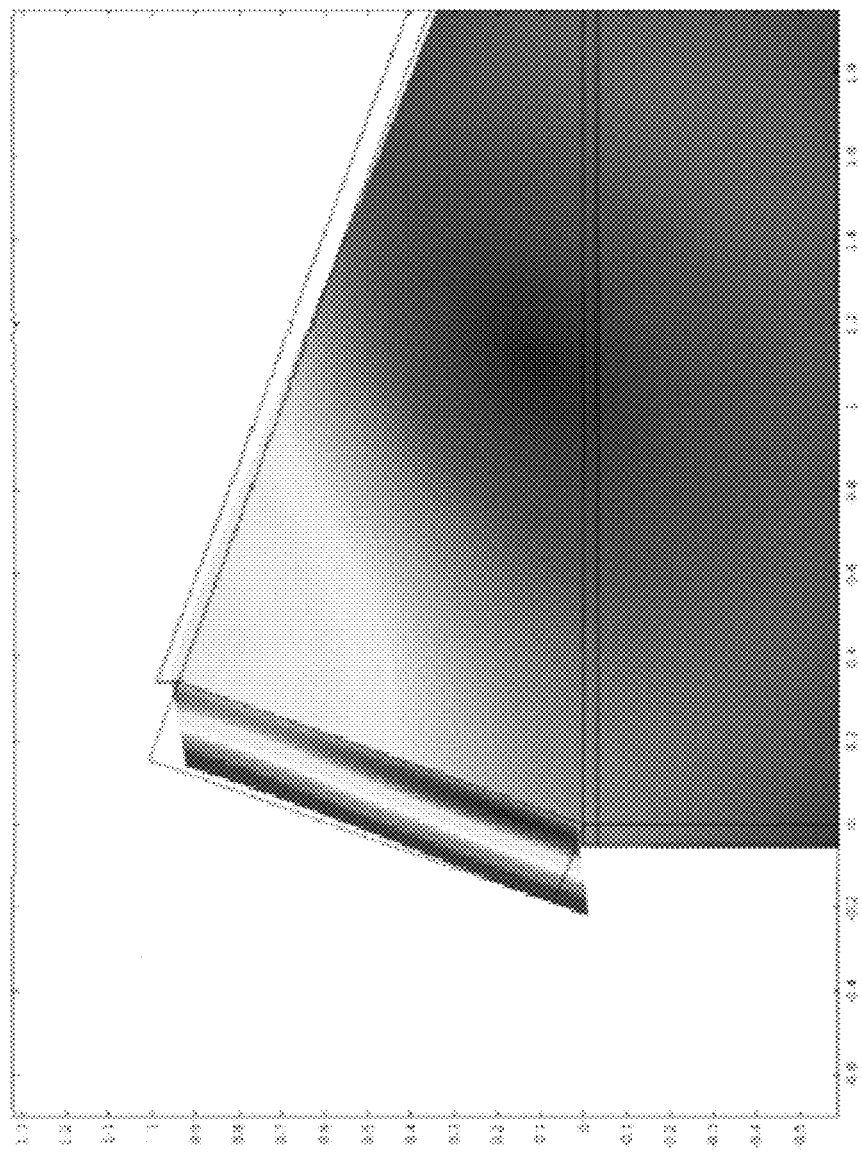
Figure 11C:
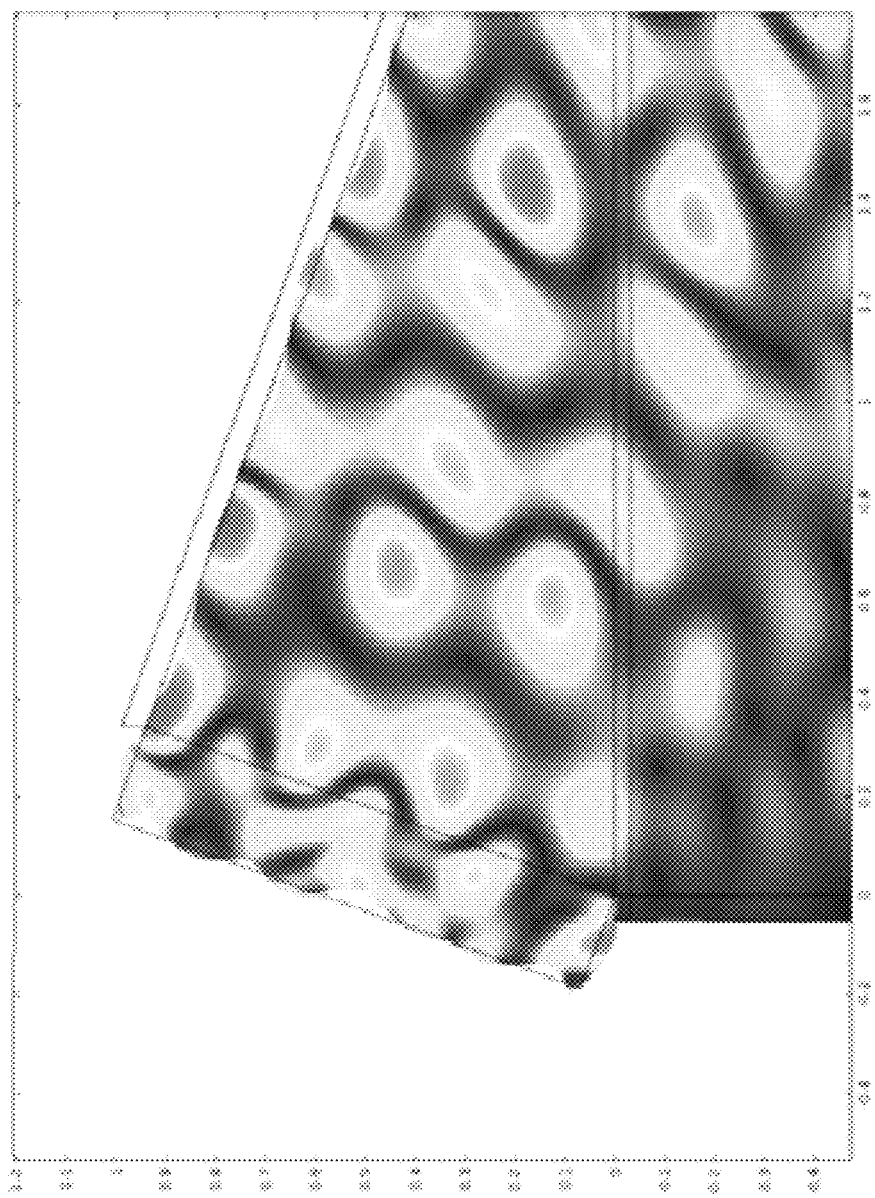
Figure 11D:
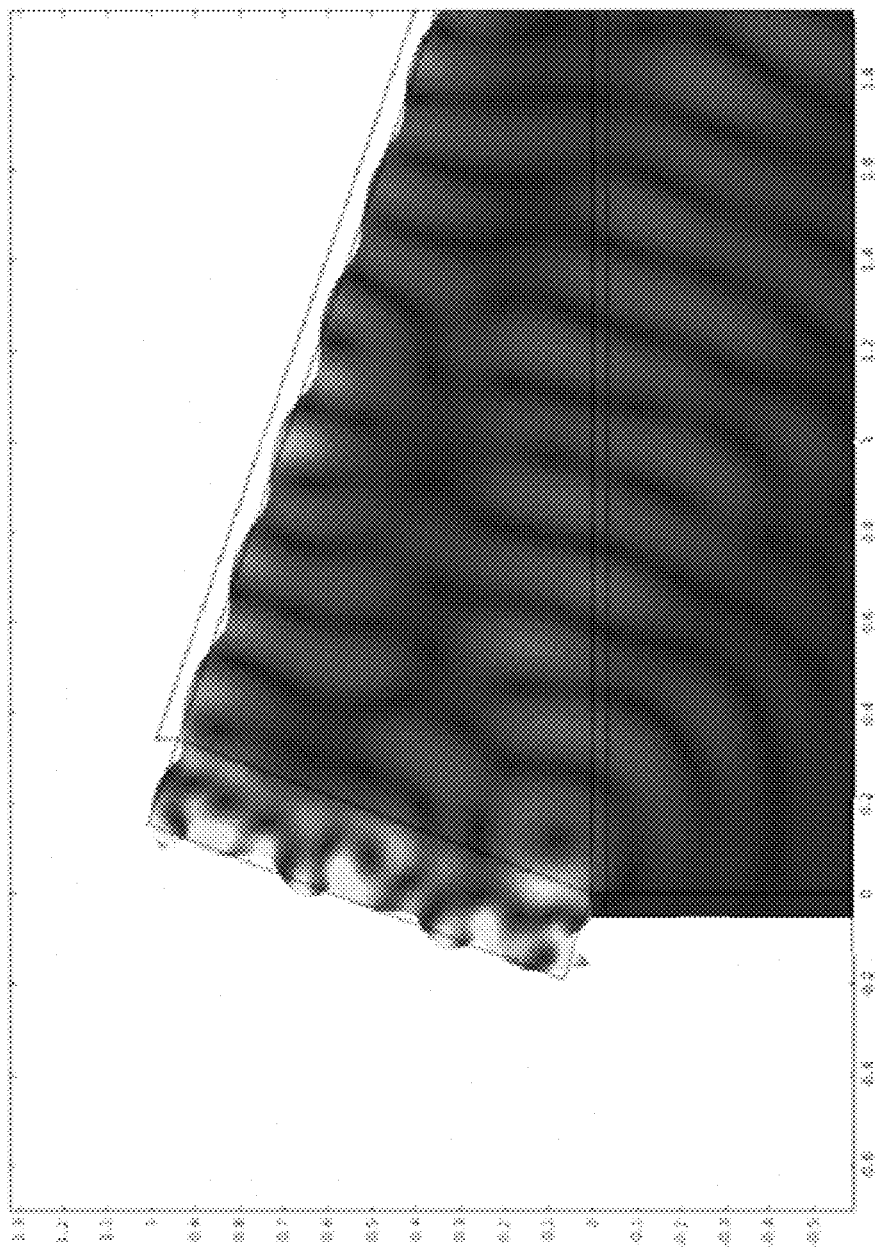

Both longitudinal and shear-poled transducers with 1 MHz nominal resonant frequencies were modeled using COMSOL. Using a wedge launch angle of 70 degrees, the transducers behave near ideally at lower frequencies (pure longitudinal/shear deformation) as shown in FIGS. 11a and 11b. At higher frequencies, a more complex behavior emerges; see FIGS. 11c and 11d. This behavioral change at higher frequencies is due to various additional vibratory modes being excited in addition to the nearly pure shear/longitudinal mode.

Figure 30:
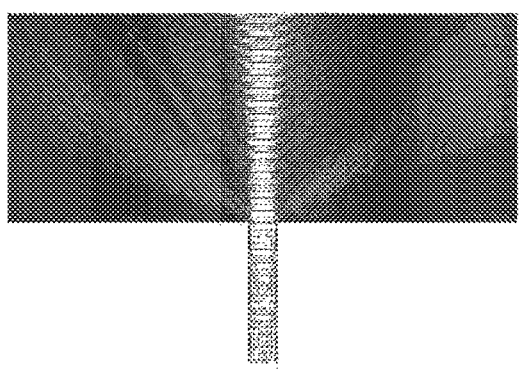
FIG. 30 is a 2-dimensional beam pattern for longitudinal excitation transferred from a small steel block into a larger steel block.
Figure 31:
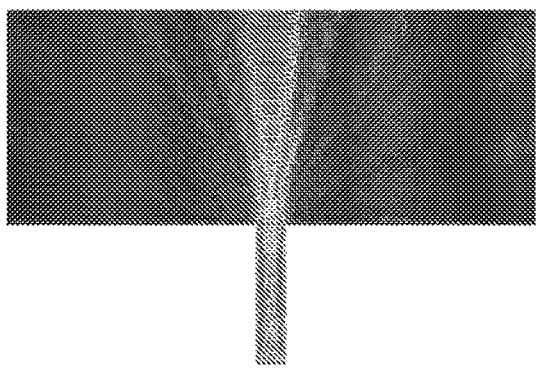
FIG. 31 is a 2-dimensional beam pattern for shear excitation transferred from a small steel block into a larger steel block.

FIG. 30 shows a 2-dimensional beam pattern for longitudinal excitation on the end of a 25.4 mm×127 mm steel block attached to a steel block vibrating at 1 MHz. FIG. 31 shows a two-dimensional beam pattern for transverse in-plane shear displacement excitation of a 25.4 mm×127 mm steel block attached to a steel block vibrating at 1 MHz. These simulations are meant to approximate potential diffraction patterns produced by a similar width wedge transmitting into a large medium. While there is some beam spread in the distances simulated, most of the beam energy is seen to remain focused within a narrow region. Unfortunately, simulations at large distances, or within a 3-dimensional domain are size-prohibitive and therefore, the resulting beam spread at these distances is difficult or impossible to obtain. Depending on the specific application, a wide, smoothly distributed diffraction pattern may be a good or bad thing. If the wedge pair can be placed with precision, a narrow pattern ensures higher energy flux at the receiver. If the final alignment of the wedges is uncertain, a narrow pattern could miss the receiver completely while a wide pattern would give a better chance of energy reception. Over long distances, perfect alignment is less likely to be achieved. Therefore, transmission arrangements over longer distances where shear waves of sufficient strength to be detected at the opposite wedge and transducer, accounting for beam spread and distance, are contemplated.

Figure 12:
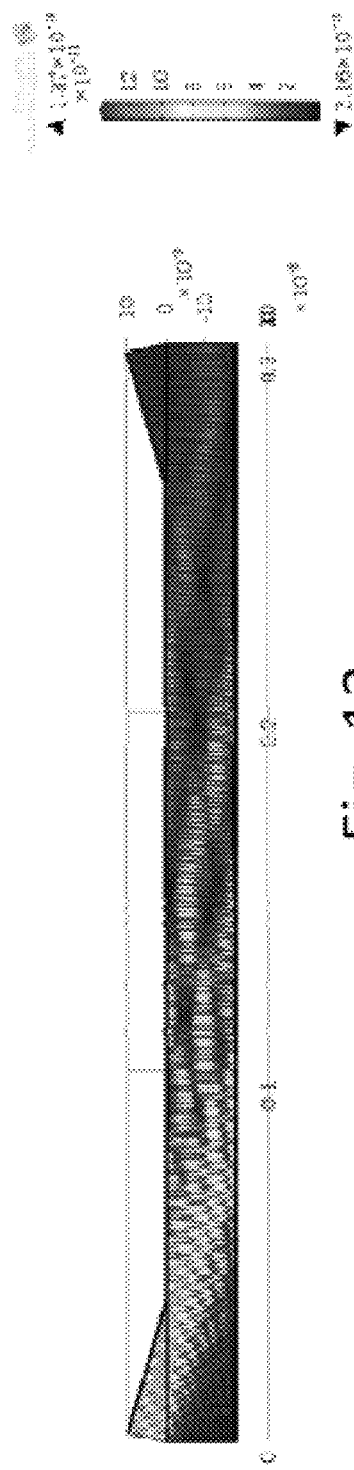
FIG. 12 is a model of tangential shear wave transmission. Displacement in meters is plotted. 75° steel wedges are used on a 12 inch steel plate with oil on the inside (top) and cement on the outside (bottom)

Tangential (transversely polarized) shear simulations have been performed using the prescribed displacement boundary condition on the transmitting wedge surface. An example plot is given in FIG. 12. FIG. 12 is a finite element analysis (FEA) model for tangential shear waves. Displacement in meters is plotted. 75° steel wedges are used on a 12 inch steel plate with oil on the inside (top) and cement on the outside (bottom). Freq(1)=1 MHz, Surface: Total displacement (m).

Figure 13:
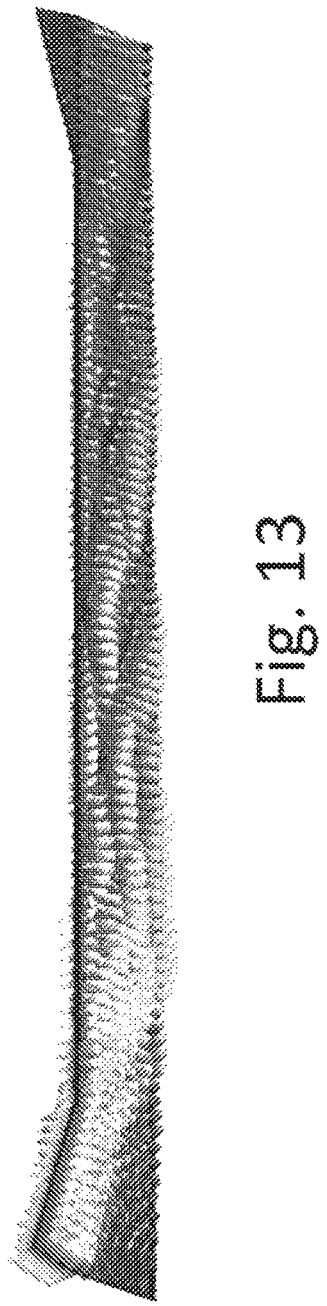
FIG. 13 is an isometric view of a tangential (transversely polarized) shear simulation showing the out-of-plane displacement (75° steel wedges, 1 MHz, 12-inch steel plate, oil on the inside (top), cement on the outside (bottom))

Tangential shear waves have an out-of-plane component which necessitates 3-dimensional models, as shown in FIG. 13. Note that in FIG. 13 much of the vibration is towards and away from the perspective of the viewer, into and out of the plane of the page. FIG. 13 is an isometric view of a tangential (transversely polarized) shear simulation showing the out-of-plane displacement (75° steel wedges, 1 MHz, 12-inch steel plate, oil on the inside (top), cement on the outside (bottom)).

Typically the receiving wedge on the right will receive the shear waves transmitted from the launch surface on the left. Note that the identity of the shear waves is maintained when leaving the wedge and entering the steel substrate. Preferred embodiments also include arrangements where power transfer efficiency is at least 0.35%, at least 0.5%, at least 0.7%, at least 0.8%, or at least 0.83%. Said power transfer efficiencies, in some embodiments, refer to power transfer efficiencies at 4 feet and/or using steel substrates and wedges, or substrates and wedges made of the same metal or metal alloy. Power transfer efficiency may be affected by the distance being traversed, among other factors.

Piezoelectric transducer arrangements and channels can be modeled using computers. Both transmitting and receiving transducers may be represented within the models, the transducers being separated by a given distance. The geometry produced in one such model may be seen in FIG. 15. The excitation voltage applied to the transmitter, or "pitcher", is specified prior to the execution of the simulation and the voltage across the "catcher" is extracted directly from the simulation results, with both values being used to calculate the transmission efficiency. An example set of results from the described model are given in FIG. 16, where longitudinal transducers are affixed to 70 degree steel wedges with the transmit and receive transducer-wedge assemblies being placed approximately 16 inches apart on the representative joint/substrate. Thin, absorptive layers of oil (inside/upper) and cement (outside/lower) are modeled at the boundary of the joint, and at the axial ends of the representative joint. Non-reflecting boundary conditions were added to allow for energy to continue propagating away from the system.

Figure 15:
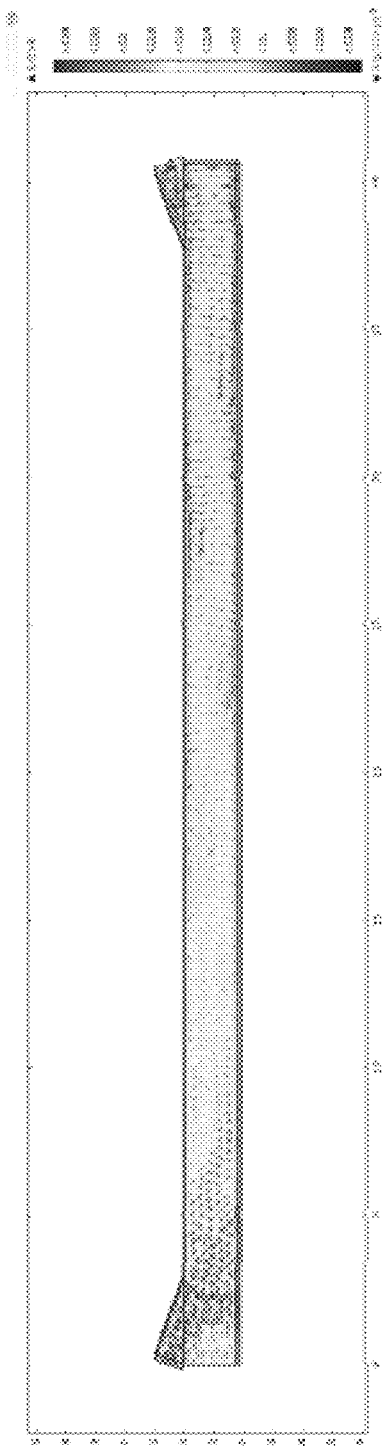
FIG. 15 is a graphed simulation with both pitcher and catcher transducers. Displacement raised to the fifth root ⅕ is plotted.

FIG. 15 is a simulation with both pitcher and catcher transducers, using a 1 MHz longitudinal wave. Displacement raised to the fifth root $\frac{1}{5}$ is plotted. The exponent serves to increase the contrast of the plot.

Prescribed Displacement Simulations

A second method for simulating transducer/wedge transmission systems (e.g. using finite element code) which avoids the complexity of simulating transducers has also been developed. Instead of simulating a transducer per se, a "prescribed displacement" boundary condition is applied to the face of the simulated wedge. This prescribed displacement, or "PD," boundary condition simply displaces the position of the simulated transducer-bearing wedge face periodically in the way a transducer would be expected to. The idea is to apply an estimated wave force to the simulated wedge face without explicitly simulating the movement of the transducer which, in real-world practice, would supply the wave force to the wedge face. Different transducer polarization types (longitudinal, shear, etc), shapes, and frequencies can be approximated for different simulations. If the axis of deflection is in a direction tangent to the face, shear waves are simulated. If the axis is perpendicular, longitudinal waves are simulated. This method has several advantages over modeling the transducer itself. Prescribed displacement is easier to implement because the model has no electric or piezoelectric aspects to simulate. This makes prescribed displacement less expensive computationally, allowing for larger and/or faster simulations of wave transmission arrangements vs. systems where transducers are explicitly simulated.

Figure 17A:
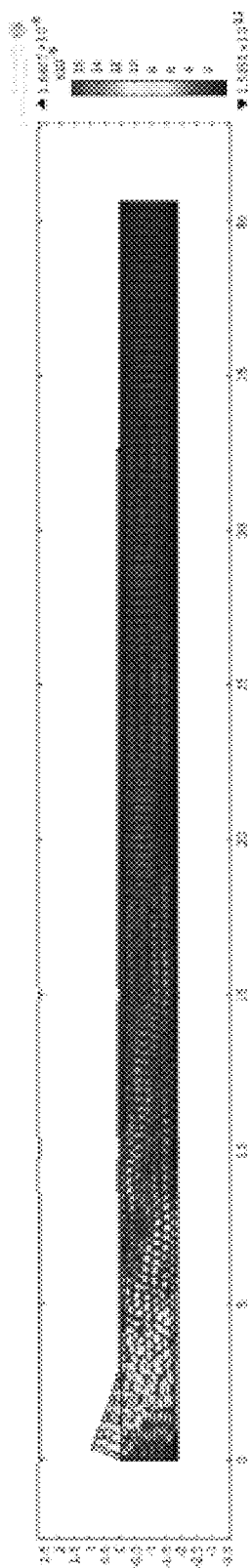
FIGS. 17(a)-17(b) compare longitudinal wave simulation methods.
Figure 17B:
Figure 18A:
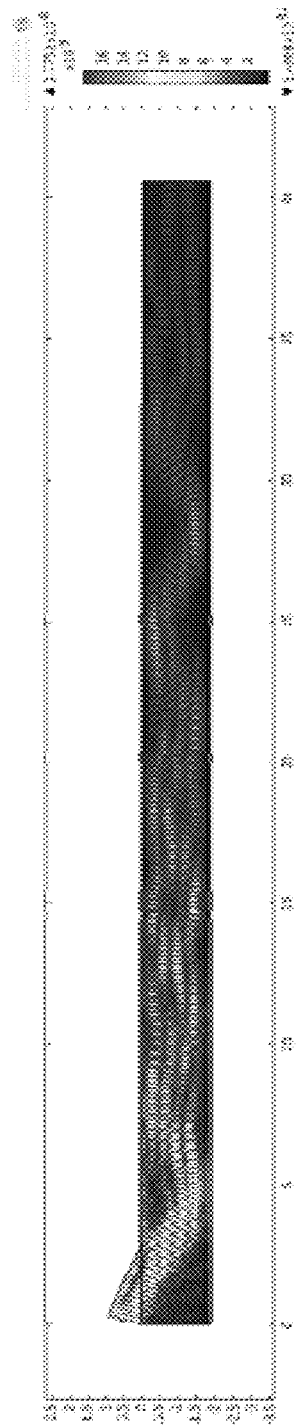

FIGS. 17(a)-18(b) compare prescribed displacement input (FIGS. 17(a) and 18(a)) and simulated transducer input (FIGS. 17(b) and 18(b)) simulations. FIGS. 17(a)-17(b) compare magnitude of displacement plotted for longitudinal input excitation. Axes have units of cm. FIG. 17(a) is a prescribed displacement input, while FIG. 17(b) is a transducer input for comparison. For both the freq(1)=1 MHz, and surface displacement is in cm. FIGS. 18(a)-18(b) compare magnitude of displacement plotted for shear input excitation. Axes have units of cm. FIG. 18(a) is a prescribed displacement input, while 18(b) is a transducer input for comparison. For both freq(1)=1 MHz, and surface displacement is in cm.

The actual effect of a transducer on a wedge face may be significantly different from what a full-face prescribed displacement simulation on that face (i.e., where displacement is same regardless of location on face) can produce. A series of tests aimed at determining the accuracy of the prescribed displacement (PD) approximation were performed. As demonstrated in FIG. 17(a) through FIG. 18(b), the PD approximation was, as expected, found to not have high accuracy in the near field; i.e. in close proximity to the source. See the far left areas of FIG. 17(a) through FIG. 18(b). However, beyond approximately 10 cm, the displacement fields produced with a transducer and with the PD approximation are nearly identical. This observation holds for both longitudinal excitation (FIGS. 17(a)-(b)) and shear excitation (FIGS. 18(a)-(b)). Since most such systems are intended to transmit energy on scales larger than 10 cm, the PD method is a very useful tool despite not perfectly replicating the near field behavior of a piezoelectric transducer.

Wave Frequencies and Transmission Angles

Figure 14:
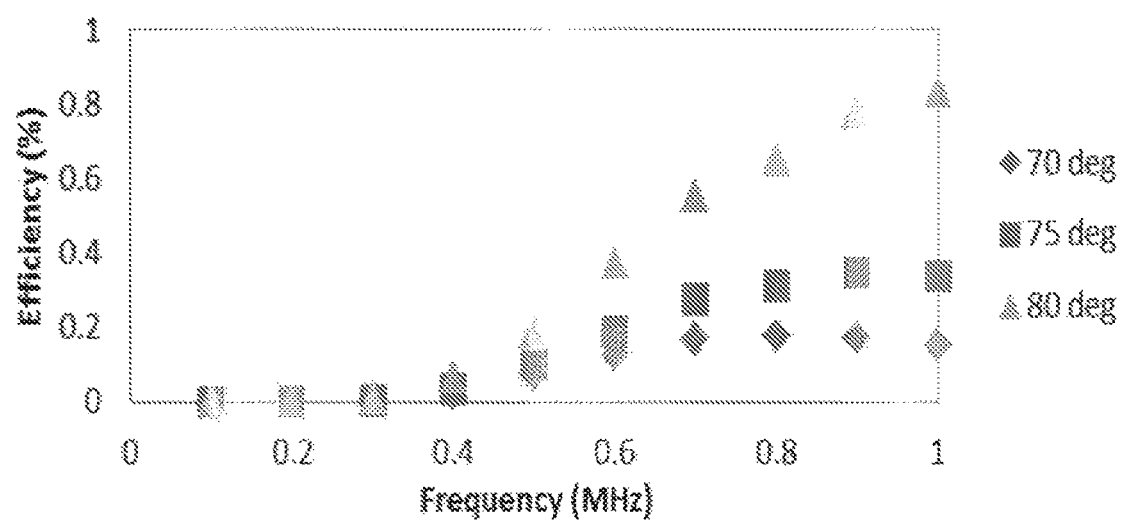
FIG. 14 is a graph of power transfer efficiency across a 4 ft beam as a function of frequency, with wedge angles 70°, 75°, and 80° for transversely polarized waves; data from the same tests are tabulated in Table 1.

A frequency sweep was performed on a 4 foot beam for three wedge angles (70, 75, and 80 degrees) and across several frequencies. FIG. 14 is a graph of power transfer efficiency as a function of frequency in that sweep, with wedge angles 70°, 75°, and 80° for transversely polarized shear waves. The angles refer to the angle of a flat face 47,57 of the transducer and of the slanted wedge face 46,56 which the transducer is fixed to, with respect to the substrate surface the bottom of the wedge is fixed to. See FIGS. 1 and 27, and also compare with FIGS. 11(a)-13, 15, 17(a)-18(b) and 23(a)-24.

The sweep results (Table 1) suggest that an 80 degree wedge will yield the highest power transfer efficiency. Table 1 shows the most efficient frequencies found for various wedge angles. Subsequent experimentation has shown that angles of approximately 65, 70, and 75 degrees also work well. Therefore, embodiments of this invention include arrangements and methods where transmitting and/or receiving slanted wedge faces, and their corresponding transducer faces, each have the following angles (in degrees) with respect to the substrate 60 surface: 65, 70, 75, 80, 60-89, 60-85, 60-80, 60-75, 65-89, 65-85, 65-80, 65-75, 68-85, 68-75, 68-72, 68-80, 70-80, 70-85, 70-87, 70-89, 75-89, 75-87, 75-85, 75-82, 75-80, 77-83, 77-85, 77-87, 78-82, 78-85, 79-81, 80-83, 80-85, and/or 80-89. Our results also suggest that frequencies of about 0.3-1.0 MHz are desirable, depending somewhat on the angle selected. Therefore, embodiments of this invention include the preferred wedge angles above, each angle contemplated in combination with each of the following preferred frequencies, in MHz: 0.6, 0.8, 1.0, at least 0.1. 0.3, 0.4, at least 0.6, at least 0.7, at least 0.8, at least 0.9, 0.1-1.0, 0.1-1.5, 0.1-2.0, 0.3-1.0, 0.3-1.5, 0.3-2.0, 0.5-2.0, 0.5-1.5, 0.5-1.2, 0.6-1.0, 0.6-1.5, 0.6-2.0, 0.7-2.0, 0.7-1.5, 0.7-1.3, 0.7-1.2, 0.7-1.0, 0.8-1.5, 0.8-1.3, 0.8-1.2, 0.8-1.0, 0.9-1.2, 0.9-1.1, and 0.9-1.0. Alternative arrangements include a wedge angle in degrees of 75, 74-76, 73-77 or 72-78, each in combination with a transmission frequency in MHz of 9.0, 8.9-9.1, 8.7-9.3, 8.5-9.5, 8.0-10.0.

TABLE 1

Dead Zones-Wedge Spacing and Excitation Frequency

| Wedge angle | Peak frequency | Efficiency |
| --- | --- | --- |
| 70° | 0.80 MHz | 0.18% |
| 75° | 0.90 MHz | 0.35% |
| 80° | 1.00 MHz | 0.83% |

Figure 16:
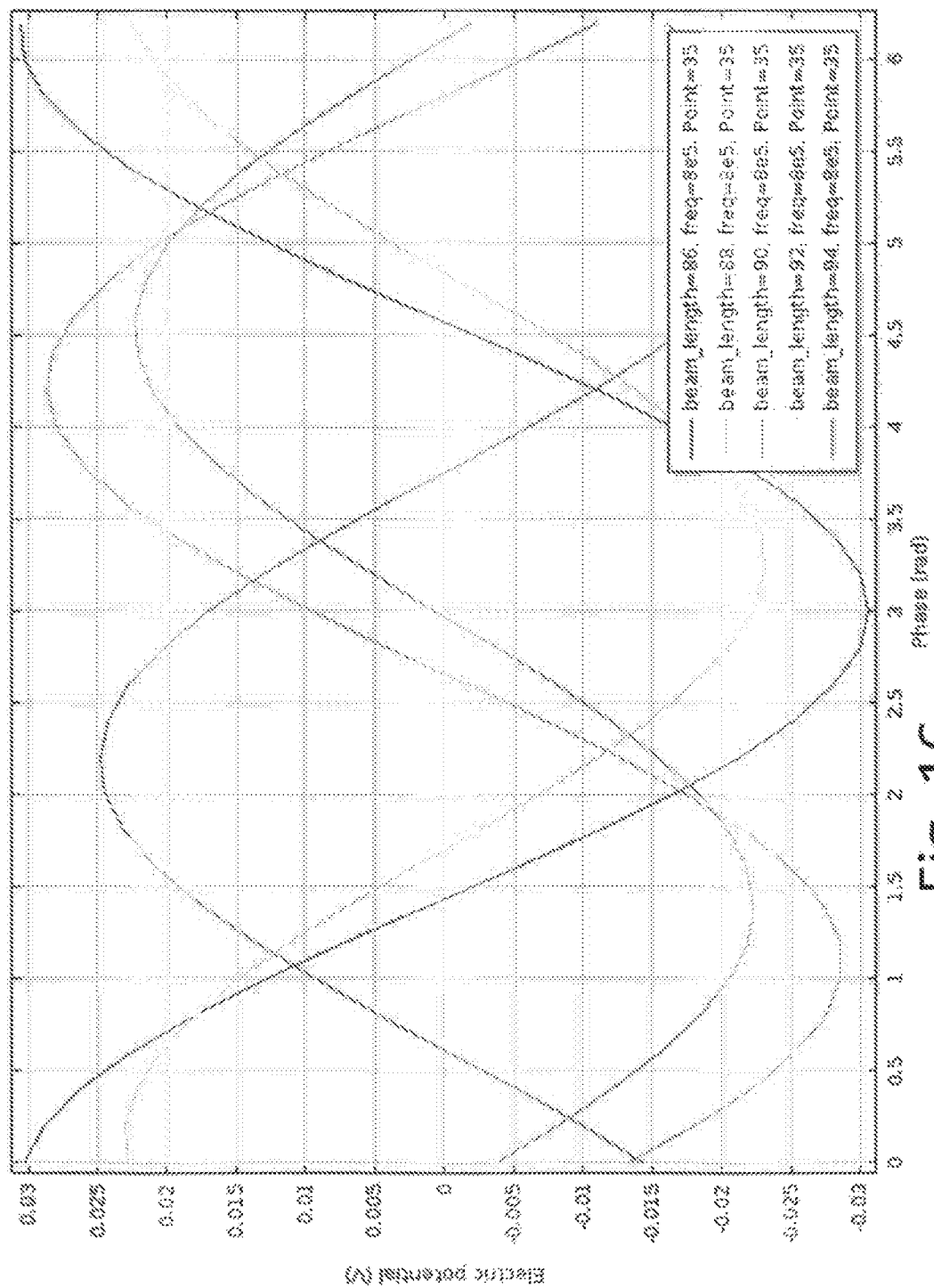
FIG. 16 shows voltage at a harvesting transducer plotted over one period for 5 different positions of the catching wedge (86 cm, 88 cm, 90 cm, 92 cm, and 94 cm)

FIG. 16 shows voltage at a harvesting transducer, plotted over one period for five different positions of the catching wedge, corresponding to five different spacings between the pitcher and catcher: 86 cm, 88 cm, 90 cm, 92 cm, and 94 cm.

As can been seen from FIG. 16, depending on the location of the wedges along the substrate joint, the arrangements may experience "dead zones," where the overall energy imparted on the surface of the substrate and, therefore, transmitted into the receiving wedge is significantly reduced as compared to more optimal placements and spacings. Dead zones may appear at intervals along the substrate, and their locations may vary based on parameters of the transmission system such as transmission frequency, angle, and channel material. See FIG. 21 and below.

A series of five simulations were completed where the spacing between the wedges was moved between 86 and 94 cm, in 2 cm increments (34 and 37 inches, 0.8 inch increments), in order to show this dead zone effect. The voltage seen at the receiver for each case is given in FIG. 16. This plot shows that the placement of the wedge at an optimal location will have a significant impact on the receiver voltage, with the maximum received voltage amplitude produced by these simulations being slightly larger than 30 mV, with a minimum received voltage amplitude being substantially lower at approximately 22 mV. It should be noted that for this model and set of simulations, the transmitter was excited with 100 V, the receiver was terminated with a 50Ω load, the wedges had an angle of 70 degrees, and the thickness of the casing is 0.7 in.

Therefore, one aspect of the present invention is determining optimal placement and spacing of wedges for a given arrangement to maximize transmission efficiency and, as a corollary, to avoid placing a receiving wedge in a dead zone on the substrate. This method can include selecting approximate locations for send and receive transducer wedges based on the desired function and setup, and then testing the efficiency of energy transfer between the wedges as one of the wedges is moved small steps closer or further from the other wedge to determine an optimum exact location in the desired general area. Either the send or the receive wedge may be stepped, depending on circumstances. The wedge being stepped may be stepped by, for example, 0.25 cm, 0.5 cm, 1 cm, 2 cm, or 3 cm intervals through the available mounting area. Preferably the optimization process is conducted using the wedge angle, transmit frequency, substrate material, and other parameters that the arrangement will operate under. A position of maximum efficiency in the desired area is identified, and a transducer and wedge are then fixed or otherwise provided at that position. A preferred embodiment of the present invention includes using preferred materials, frequencies, shear waves, and launch angles as discussed elsewhere in combination with using a stepping process to optimize wedge placement and avoid dead zones, preferably for each new installation or type of installation.

Figure 21:
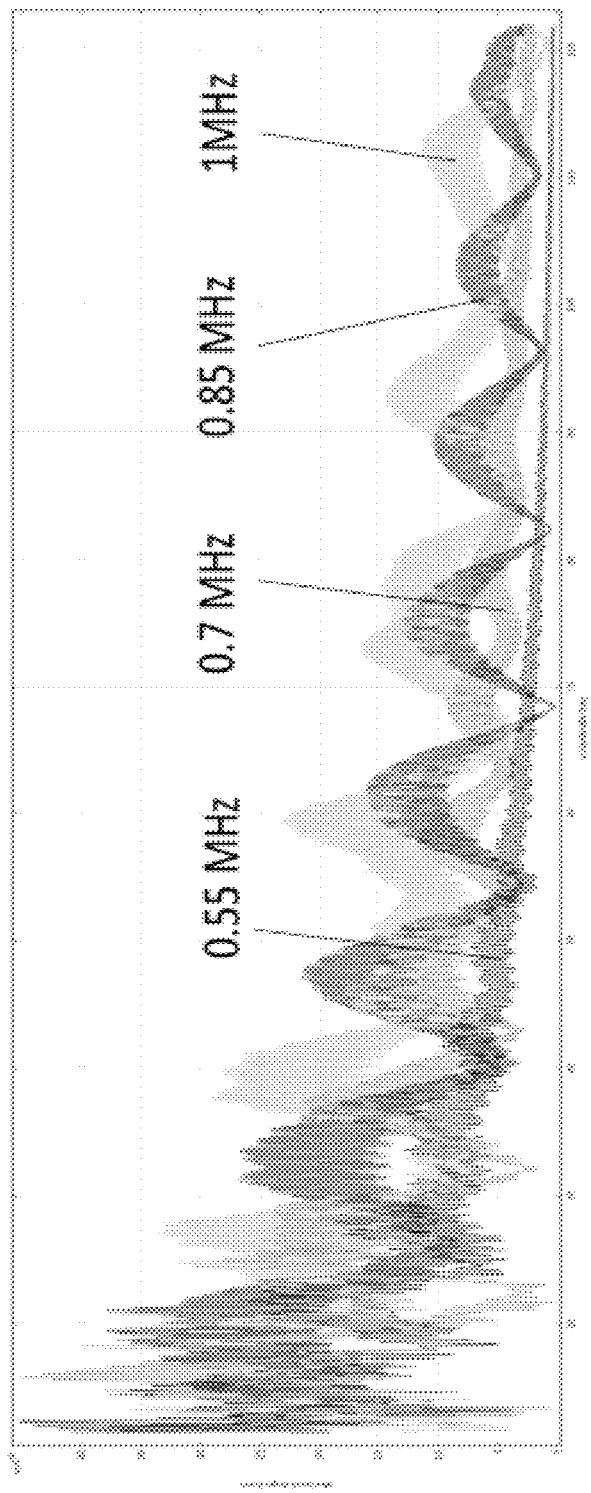
FIG. 21 is a graph of particle displacement on the inner surface of a substrate along its length for four frequencies: 1 MHz, 0.85 MHz, 0.7 MHz, and 0.55 MHz.

As mentioned, dead zone locations and sizes depend on a variety of factors including the frequency of excitation and the input angle. In FIG. 21, the total displacement of the inner surface of the joint is given along its length for four different excitation frequencies (1, 0.85, 0.7 and 0.55 MHz). It was determined that as the input frequency is reduced, the troughs become less apparent and so dead zones are less of a factor at larger distances from the transmitting wedge. However as frequency is reduced, the magnitude of the displacement is also reduced, especially further away from the transmitting wedge, and so less energy is available to detect and use as a power source at a receiving wedge. The unlabeled vertical scale is relative in FIG. 21 as displacements are dependent on the magnitude of the prescribed displacement, an arbitrary quantity. Higher frequency waves "beam" more effectively while lower frequencies spread out more quickly due to diffraction. While not wishing to be bound by theory, this is thought to explain the correlations between amplitude, peakiness, and frequency.

Figure 23A:
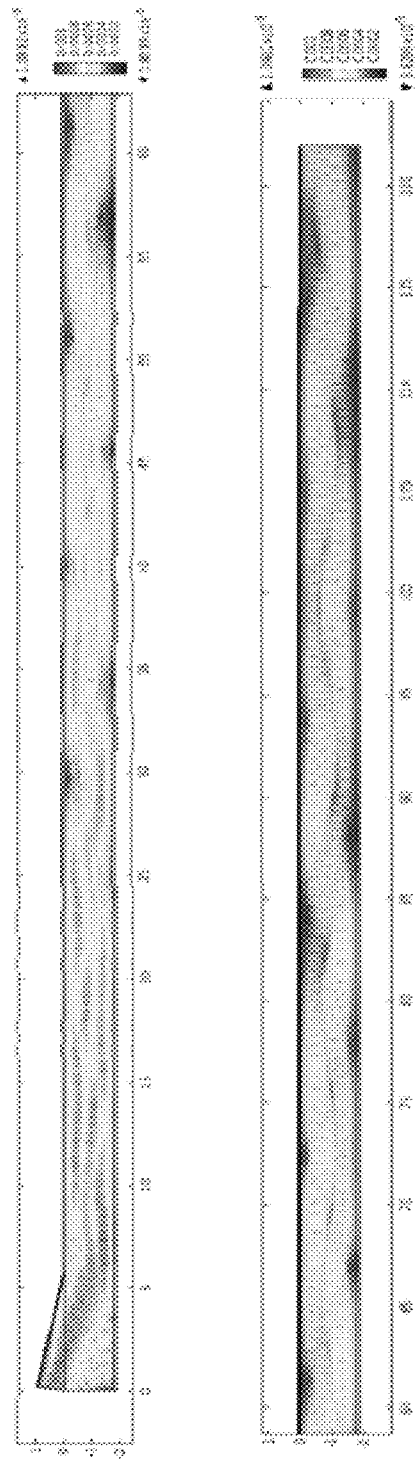
FIGS. 23(a)-23(b) depict energy transmission using a finite element model. Each channel includes a 4 ft substrate and 80° wedges, with each model being split into two plots in order to fit on the page. Displacement is plotted.
Figure 23B:
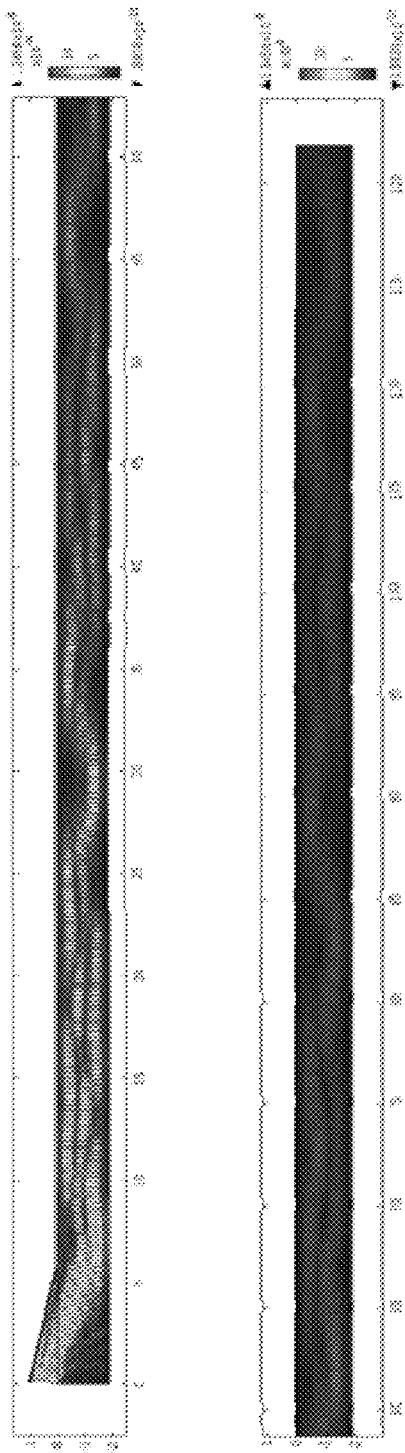

An extended joint length simulation was performed. For this evaluation, the model was constructed with an 80 degree transmit wedge and a 4 ft length of joint as the substrate. The wedges were excited in the in plane (radial) shear mode. The results of this evaluation are given in FIGS. 23(a)-23(b). FIGS. 23(a)-23(b) depict extended length evaluations of finite element model. Each is a 4 ft length with 80° wedges, with each beam being split into two plots in order to fit on the page. Displacement is plotted. FIG. 23(a) is high contrast (displacement 0.3), and FIG. 23(b) is regular. These plots show fairly regular and periodic behavior of the displacement throughout the length of the joints.

Axially longer receiving wedges have a greater probability of contacting a strong vibration receiving areas of the substrate, as opposed to a dead zone. Receiving wedges having an axial length of about 2.5-3 inches are useful. Wedges with axial lengths of about 2-3 inches, 2-3.5 inches, 1.5-3.5 inches, 1-4 inches, and 2-4 inches are also contemplated, without limitation.

Channels with Multiple Send or Receive Wedges

Figure 22:
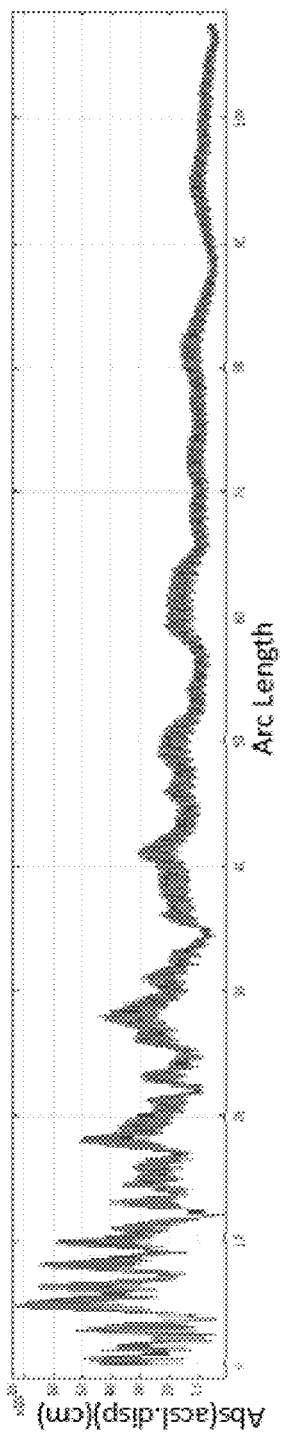
FIG. 22 is a graph of maximum displacement along the inner wall of a substrate having two adjacent transmit wedges.

In an effort to reduce the likelihood of placing the receiving wedge on a dead zone, systems with two transmitting wedges (one immediately after the other axially) were modeled. The resulting inner surface displacement is shown in FIG. 22, using an input frequency of 1 MHz. Comparing this plot with the results given in FIG. 21 shows less clearly defined dead zone behavior, with the displacement magnitude being less variable with the distance from the sources. Transmission efficiency was not diminished by the use of two wedges. Embodiments using two, three, or more transmitting wedges in series are therefore very promising and are part of this invention, particularly for embodiments where transmission conditions/parameters are likely to vary over time, and/or where it is not possible or practical to optimize the placement of the wedges, such as by a stepping process. The send arrangement and/or the receive arrangement may include multiple wedges, each holding a transducer.

Efficiency Effect of Incident Angles and Boundary Conditions

Using the PD approximation, a series of simulations were completed in order to determine how the incident angle of the transmitted wave affects the effective attenuation rate. These simulations were performed with just a transmitter wedge (steel) attached to a joint plate, with the receiver wedge omitted. Energy flux in the plate was recorded at a distance of 8 in from the transmitting wedge for input angles from 0 degrees (transmission direction perpendicular to the joint wall, maximum steepness, transducer facing downwards) to 80 degrees (transmission direction nearly parallel to the joint wall, transducer face nearly vertical, similar to FIG. 27).

Figure 19:
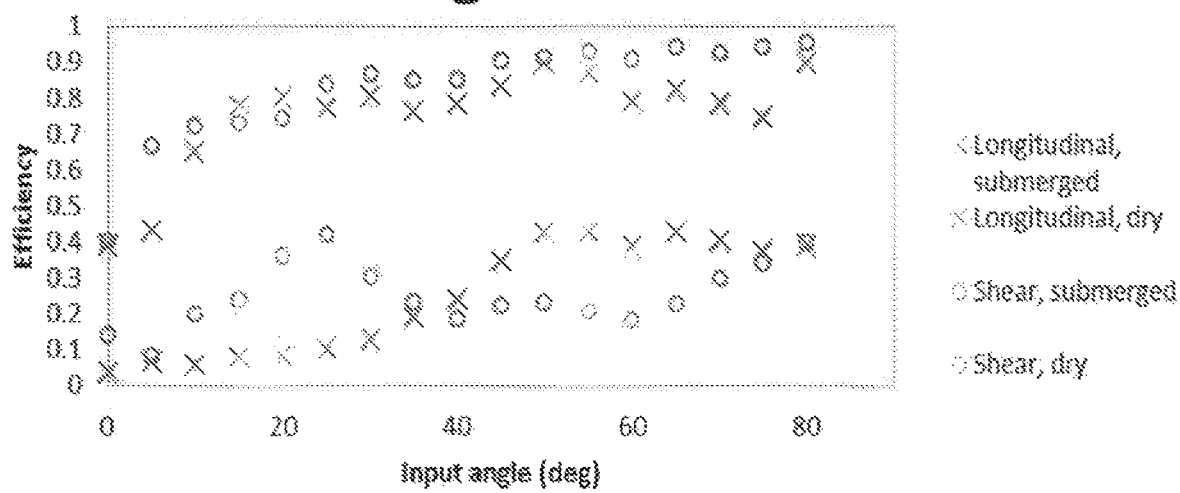
FIG. 19 is a graph of energy flux efficiency in a beam, under dry and submerged conditions, at a distance of 8 inches from the transducer.

The evaluations were performed with the plate substrate in the air and also in water. The results are presented in FIG. 19. The "efficiency" levels in the chart refers to output energy flux, normalized by the energy flux at the input face. I.e., the fraction of the energy at the transmit wedge which is received at the plate face where, normally, a receive wedge would be. In FIG. 19, the upper two series of data points (X and O) are both dry conditions, and the lower two (also X and O) are both submerged.

As shown, when the joint is in air and not submerged, shear wave transmission (normally created by shear transducer excitation) is more efficient than longitudinal transmission at most incident angles. See the upper two series of X and O. When the substrate is submerged, however, the superiority of shear versus longitudinal transmission varies depending on the incident angle. Specifically, at steeper input angles less than 40 degrees, longitudinal excitation is more effective, while shear mode transmission provides greater efficiency at most shallower (i.e. greater) incident angles. Therefore, aspects of this invention include using input angles of at least 50, at least 60, at least 70, at least 80, 50-89, 60-89, 60-80, 60-85, 70-89, 70-85, or 70-80 with shear wave transmission when the transmission channel is in a dry environment. Other aspects include using shear vibrations and an input angle in degrees of 25, 20-30, 15-35, 15-30, 10-25, 10-30, or 10-35 when the channel is in a submerged environment, especially with liquid on all sides. Another aspect is using longitudinal vibrations and an input angle in degrees of 50-70, 45-70, 50-65, or 45-70.

Figure 20:
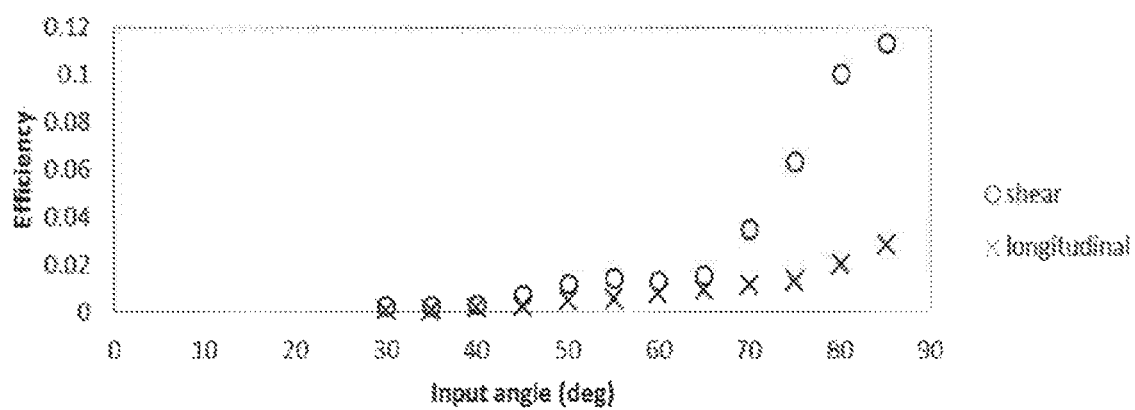
FIG. 20 is a graph of energy transmission in a simulated beam where the outer wall is bounded by cement and the inner is bounded by oil.

A second, especially relevant set of transmission simulations included a virtual receiving wedge and boundary conditions similar to those in an oil well. Energy transmission between a transmitting wedge and a section of the inner surface of the pipe, effectively a virtual receiving wedge. These simulations used boundary conditions of cement on the outside and engine oil on the inside. The section of the pipes surface that was monitored for energy flux was 8 cm long and started 32.6 cm from the transducer. The results of these simulations are given in FIG. 20. Under these "real world" conditions, arrangements using a shear waves at a shallow input angle (70 to nearly 90 degrees) were clearly superior to arrangements using longitudinal waves and arrangements using steeper (i.e. lower) input angles. Therefore, most preferred embodiments of this invention include embodiments where the channel substrate has a solid barrier on one side and liquid on the other side, for example, a pipe for carrying oil, water, or other liquids which is encased in concrete and/or underground. Preferably shear wave transmission is used in such arrangements, and most preferably tangential shear wave transmission. Preferably high input angles are used. Specifically, in degrees, at least 65, 70, 75, 80, or 85 degrees, or within the following ranges: 60-70, 70-89, 70-85, 75-89, 75-85, 80-89, 80-87, 80-85, 83-89, 83-87, 83-85, 85-89, or 85-87.

Tangential Shear Poling is Superior to Radial Shear Poling in Submerged Conditions In addition to the computer simulations discussed above, physical testing was also performed with transducer/wedge/substrate acoustical arrangements. In total, seven wedge channels were assembled and tested on a joint substrate, with the packer. For each channel, the packer was within the acoustic propagation path and a shear plate transducer was used. FIG. 24 is a picture of an assembled acoustic channel across packer, composed of shear plate transducers on 75° steel wedges epoxied to the outside of a joint. The first transducers assembled onto a joint were shear plate piezo-electric mounted on 75° steel wedges, which were spaced 4 feet apart across the joint with packer located inside the section of joint that lies between the wedges. The steel wedges in this channel had a flat interface machined onto them, meaning that the bottom surface did not match the curvature of the joint and, therefore, the thickness of the epoxy layer was variable with respect to the circumferential location. Note that more preferred embodiments do not use epoxy or other adhesives. Rather, wedges and substrates are made of the same material, and which have no other material or empty spaces between them. For example, a direct steel-steel bond, or wedges pressed firmly against the substrate, such as by a clamp, wrap, tape, cable, elastic member, or other external compression means.

An important aspect of the assembled channels (wedge-pipe wall-wedge) is the direction of poling of the shear transducers, which refers to the particle displacement direction of the generated acoustic wave with regard to the plane of the acoustic wedge). FIGS. 25(a)-25(b) schematically illustrate radial vs. tangential shear wave poling with respect to a partial cross-section of a pipe casing. 25(a) (left) shows radial shear displacement (in-wedge-plane poling), and 25(b) (right) shows tangential shear displacement (perpendicular to the wedge plane or out of wedge plane poling). The first two channels assembled were tested in part to determine the effect of the different polings on channel efficiency. It was shown in the tests that tangential shear poling is superior to radial shear poling in a submerged environment.

Figure 26:
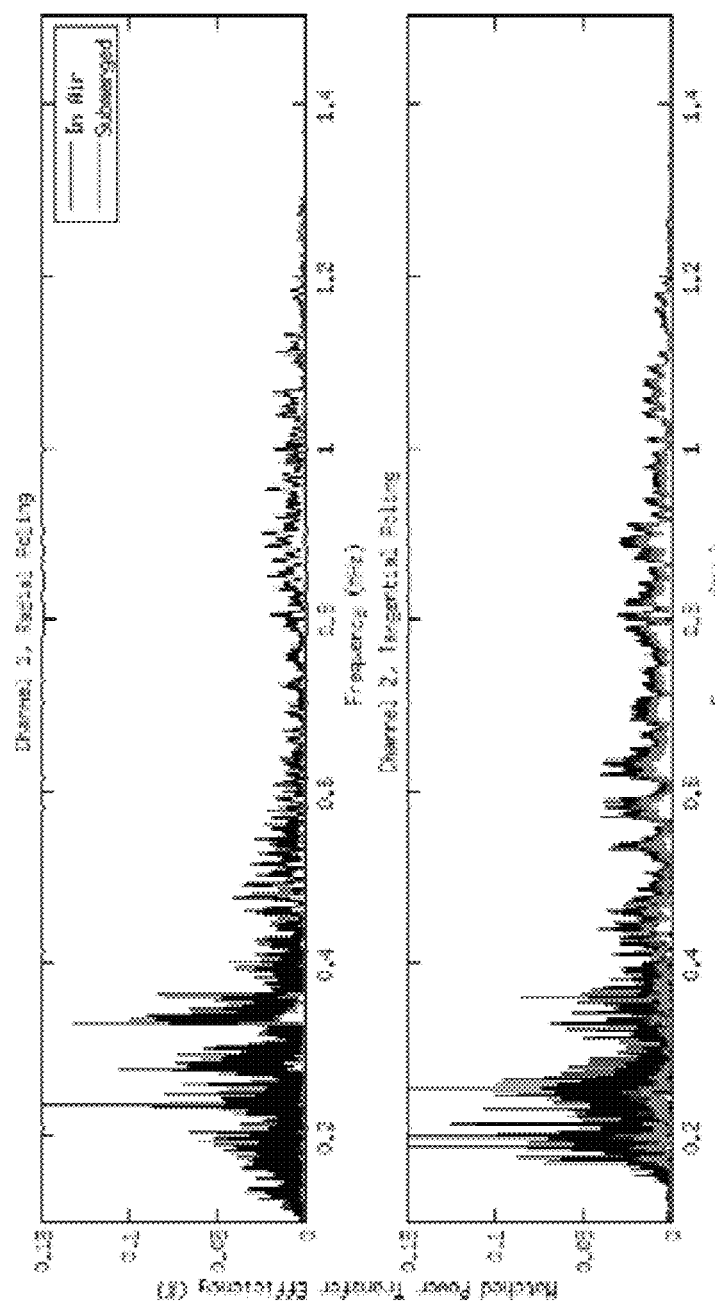
FIG. 26 is a pair of graphs comparing the efficiency of radial shear poling (top) and tangential shear poling (bottom) in air and submerged.

FIG. 26 is a pair of graphs comparing the efficiency of radial shear poling (top) and tangential shear poling (bottom) in air and submerged. For each of the following channel characterizations, both the in-air (black) and submerged (gray) results are given on the same plot. Referring to FIG. 26, in air both the radial and tangential channels are capable of similar power transfer efficiencies. However, when placed in a tank with water, the radially poled channel's capacity falls off, while the tangential channel maintains a similar, or at least adequate, efficiency across most frequencies. Though not wishing to be bound by theory, this difference is understood to be due to greater and lesser degrees of interaction with surrounding water, which irretrievably removes transmission energy from the channel. Compare FIGS. 25(a) and 25(b), imagining liquid on at least one side of the substrate. When the vibrations in the metal wedges and substrate are radially poled (in-plane poling—FIG. 25(a)), interaction with the water at the surfaces creates longitudinal waves in the water, meaning that vibrational energy leaves the channel. When the displacement is tangential to the surface of the pipe, however, (FIG. 25(b)) there is far less water/channel surface interaction. There is therefore far less energy loss to the surrounding water with tangential shear poling, and less energy is thereby lost in a submerged system. As a result of these findings, certain most preferred embodiments of this invention utilize tangential shear polling and transversely polarized shear transducers to transmit energy, particularly when at least part of the channel is in contact with a liquid such as water or oil. When the channel surfaces contact air, in contrast to liquid, the interactions with surrounding particles absorb far less energy, so the difference between radial and tangential polling is much less pronounced. Consider, analogously, how it requires more effort to push your hand a given distance through water than through air.

Horizontal and circumferential poling are subtypes of tangential shear poling, which are specific to planar and tubular substrates, respectively. Horizontal and circumferential poling are therefore contemplated and interchangeable where "tangential" shear waves and tangential poling are discussed in this document, where appropriate.

CONCLUSION

The present invention includes both methods and apparatus based on the above disclosures. The present invention includes methods of assembling, optimizing, and testing transducer driven transmission systems. It also includes methods of testing and simulating transducers and acoustic transmission arrangements.

Nothing in this disclosure shall be construed as a representation or admission regarding what is or is not prior art absent a specific statement to that effect. The inclusion of material in the background section or any other section, for example, is not to be construed as a representation regarding what is or is not prior art.

The elements, systems, and methods disclosed herein are contemplated and disclosed in all reasonable combinations and sub-combinations. It should be understood that various preferred elements disclosed herein can be used both separately and together. While a specific embodiment of the invention has been shown and described in detail to illustrate the application of the principles of the invention, it will be understood that the invention may be embodied otherwise without departing from such principles.

What is claimed is:

1. A method of transmitting at least one of power and signals along a steel oil pipe using tangential shear waves, the method comprising:
    providing a transmitting arrangement and a receiving arrangement spaced apart on a steel oil pipe;
    wherein the oil pipe has concrete on at least a portion of an outer surface, and wherein, in an operative state, oil is in contact with an inner surface of the oil pipe;
    wherein each transmitting arrangement comprises a steel transmitting wedge and a transmitting transducer coupled to the transmitting wedge, and wherein each receiving arrangement comprises a steel receiving wedge and a receiving transducer coupled to the receiving wedge;
    wherein the transmitting transducer comprises a flat transmitting face for emitting tangential shear waves, the transmitting face of the transmitting transducer being coupled to an angled face of the transmitting wedge;
    wherein the transmitting face of the transmitting transducer and the angled face of the transmitting wedge are both normal to an angle $\Theta$ with respect to the surface of the oil pipe which the transmitting wedge is coupled to;
    wherein the angle $\Theta$ is an angle of at least 65 degrees and not more than 85 degrees;
    the method further comprising the transmit transducer producing tangential shear waves at angle $\Theta$, with said shear waves propagating through the transmitting wedge and into the oil pipe, through the oil pipe, and then into the receiving wedge, with said tangential shear waves being received by the receiving transducer;
    wherein said tangential shear waves substantially remain tangential shear waves as they propagate through the transmitting wedge, the oil pipe, and the receiving wedge; and
    the receiving transducer converting at least a portion of an energy content of said tangential shear waves into electrical energy.

2. The method of claim 1, wherein the angle $\Theta$ is an angle of at least 70 degrees and not more than 83 degrees.

3. A method of transmitting at least one of power and signals along a substrate using shear waves, the method comprising:
    providing a transmitting arrangement and a receiving arrangement spaced apart on a substrate;
    wherein each transmitting arrangement comprises a transmitting wedge and a transmitting transducer coupled to the transmitting wedge, and wherein each receiving arrangement comprises a receiving wedge and a receiving transducer coupled to the receiving wedge;
    wherein the transmitting transducer comprises a flat transmitting face for emitting shear waves, the transmitting face of the transmitting transducer being coupled to an angled face of the transmitting wedge;
    wherein the transmitting face of the transmitting transducer is normal to an angle $\Theta$ with respect to the surface of the substrate which the transmitting wedge is coupled to; wherein the angle $\Theta$ is an angle of at least 65 degrees and not more than 89 degrees;
    the method further comprising the transmit transducer producing shear waves at angle $\Theta$, with said shear waves propagating through the transmitting wedge and into the substrate, through the substrate, and then into the receiving wedge, with said shear waves being received by the receiving transducer;
    wherein said shear waves substantially remain shear waves as they pass through the transmitting wedge, the substrate, and the receiving wedge; and
    the receiving transducer converting at least a portion of an energy content of said shear waves into electrical energy.

4. The method of claim 3, wherein the arrangement comprises a plurality of transmitting arrangements, with said transmitting arrangements positioned in series along an axial length of the pipe; and wherein said transmitting arrangements all produce shear waves.

5. The method of claim 3, wherein the substrate, the transmitting wedge, and the receiving wedge all comprise steel.

6. The method of claim 3, wherein the substrate, the transmitting wedge, and the receiving wedge all comprise steel, and wherein each transmitting wedge and each receiving wedge is directly bound to a surface of the substrate by a direct steel-steel bond.

7. The method of claim 3, wherein the substrate, the transmitting wedge, and the receiving wedge are all made of the same material.

8. The method of claim 3, wherein the shear waves are tangential shear waves.

9. The method of claim 3, wherein the angle $\Theta$ is an angle of at least 70 degrees and not more than 85 degrees.

10. The method of claim 3, wherein the shear waves are tangential shear waves; and wherein the angle Θ is an angle of at least 70 degrees and not more than 85 degrees.

11. The method of claim 3, wherein the substrate is a metal pipe, and wherein the transmitting wedge and the receiving wedge are both made out of a same metal as the metal pipe.

12. The method of claim 3, wherein the substrate is a pipe; wherein the transmitting arrangement is above ground level; and wherein the receiving arrangement is below ground level.

13. The method of claim 3, wherein the substrate is an oil pipe, wherein the oil pipe has concrete on at least a portion of an outer surface, and wherein, in an operative state, oil is in contact with an inner surface of the oil pipe; and wherein the shear waves are tangential shear waves.

14. The method of claim 3, wherein the substrate is a steel oil pipe, wherein the oil pipe has concrete on at least a portion of an outer surface, and wherein, in an operative state, oil is in contact with an inner surface of the oil pipe; wherein the transmitting wedge and the receiving wedge are both made out of steel; and wherein the shear waves are tangential shear waves.

15. The method of claim 3, wherein transmissions are also sent in a reverse direction, from the receiving wedge to the transmitting wedge, using shear waves produced by the receiving transducer.

16. An arrangement for transmitting at least one of power and signals along a pipe using shear waves, the arrangement comprising:
   a transmitting arrangement and a receiving arrangement spaced apart on the pipe;
   wherein each transmitting arrangement comprises a transmitting wedge and a transmitting transducer coupled to the transmitting wedge, and wherein each receiving arrangement comprises a receiving wedge and a receiving transducer coupled to the receiving wedge;
   wherein the transmitting transducer is a shear wave transducer, and is positioned on the transmitting wedge so that, in operation, the transmitting transducer will send shear wave vibrations into the transmitting wedge;
   wherein the transmitting transducer comprises a flat transmitting face for emitting shear waves, the transmitting face of the transmitting transducer being coupled to an angled face of the transmitting wedge;
   wherein the transmitting face of the transmitting transducer is normal to an angle Θ with respect to the surface of the pipe which the transmitting wedge is coupled to;
   wherein the angle Θ is an angle of at least 65 degrees and not more than 89 degrees; and
   wherein the transmitting wedge, the pipe, and the receiving wedge collectively form a continuous acoustic channel, the channel being capable of carrying shear wave vibrations between the transmitting transducer and the receiving transducer.

17. The arrangement of claim 16, wherein the pipe is an oil pipe; wherein the oil pipe has concrete on at least a portion of an outer surface, and wherein, in an operative state, oil is in contact with an inner surface of the oil pipe.

18. The arrangement of claim 16, wherein the pipe, the transmitting wedge, and the receiving wedge all comprise steel; and wherein each transmitting wedge and each receiving wedge are directly bound to a surface of the pipe by a direct steel-steel bond.

19. The arrangement of claim 16, wherein the arrangement comprises at least two transmitting arrangements, with said transmitting arrangements positioned adjacent to each other and in series along an axial length of the pipe.

20. The arrangement of claim 16, wherein the angle Θ is an angle of at least 70 degrees and not more than 85 degrees.

* * * * *